(12) United States Patent
Obayashi et al.

(10) Patent No.: US 10,889,870 B2
(45) Date of Patent: Jan. 12, 2021

(54) STEEL COMPONENT, GEAR COMPONENT, AND PRODUCING METHOD FOR STEEL COMPONENT

(71) Applicants: AISIN AW CO., LTD., Anjo (JP); NIPPON STEEL & SUMITOMO METAL CORPORATION, Tokyo (JP)

(72) Inventors: Koji Obayashi, Toyoake (JP); Kazuaki Okada, Anjo (JP); Keisuke Matsuzaka, Okazaki (JP); Masashi Sakakibara, Handa (JP); Manabu Kubota, Nishinomiya (JP); Kei Miyanishi, Kitakyushu (JP); Tatsuya Koyama, Muroran (JP)

(73) Assignees: AISIN AW CO., LTD., Anjo (JP); NIPPON STEEL CORPORATION, Tokyo (JP)

( * ) Notice: Subject to any disclaimer, the term of this patent is extended or adjusted under 35 U.S.C. 154(b) by 217 days.

(21) Appl. No.: 16/076,658

(22) PCT Filed: Mar. 8, 2017

(86) PCT No.: PCT/JP2017/009186
§ 371 (c)(1),
(2) Date: Aug. 8, 2018

(87) PCT Pub. No.: WO2017/154964
PCT Pub. Date: Sep. 14, 2017

(65) Prior Publication Data
US 2019/0078171 A1 Mar. 14, 2019

(30) Foreign Application Priority Data
Mar. 8, 2016 (JP) .................. 2016-044339

(51) Int. Cl.
| | | |
|---|---|---|
| C21D 1/10 | (2006.01) | |
| C21D 7/06 | (2006.01) | |
| C21D 9/32 | (2006.01) | |
| C21D 1/18 | (2006.01) | |
| C22C 38/00 | (2006.01) | |
| C22C 38/60 | (2006.01) | |
| C21D 1/06 | (2006.01) | |
| C21D 1/09 | (2006.01) | |
| C23C 8/22 | (2006.01) | |
| C22C 38/02 | (2006.01) | |
| C22C 38/04 | (2006.01) | |
| C22C 38/06 | (2006.01) | |
| C22C 38/22 | (2006.01) | |
| C22C 38/24 | (2006.01) | |
| C22C 38/26 | (2006.01) | |
| C22C 38/28 | (2006.01) | |
| C22C 38/32 | (2006.01) | |
| C22C 38/34 | (2006.01) | |

(52) U.S. Cl.
CPC .............. *C21D 1/10* (2013.01); *C21D 1/06* (2013.01); *C21D 1/09* (2013.01); *C21D 1/18* (2013.01); *C21D 7/06* (2013.01); *C21D 9/32* (2013.01); *C22C 38/00* (2013.01); *C22C 38/001* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/60* (2013.01); *C23C 8/22* (2013.01); *C21D 2211/001* (2013.01); *C21D 2211/004* (2013.01); *C21D 2211/008* (2013.01); *Y02P 10/20* (2015.11); *Y02P 10/25* (2015.11)

(58) Field of Classification Search
CPC ... C21D 1/10; C21D 7/06; C21D 9/32; C21D 1/18; C21D 1/06; C21D 1/09; C22C 38/60; C22C 38/04; C22C 38/06; C23C 8/22
See application file for complete search history.

(56) References Cited

U.S. PATENT DOCUMENTS

| | | |
|---|---|---|
| 8,733,199 B2 | 5/2014 | Obayashi et al. |
| 2005/0173026 A1 | 8/2005 | Taniguchi et al. |
| 2007/0102068 A1 | 5/2007 | Taniguchi et al. |
| 2012/0247249 A1 | 10/2012 | Obayashi et al. |

(Continued)

FOREIGN PATENT DOCUMENTS

| | | |
|---|---|---|
| CN | 1539026 A | 10/2004 |
| JP | 2011-184768 A | 9/2011 |
| JP | 2013-104081 A | 5/2013 |
| JP | 2014-019926 A | 2/2014 |
| KR | 20090121308 A | 11/2009 |

(Continued)

OTHER PUBLICATIONS

Nov. 13, 2018 Search Report issued in European Patent Application No. 17763304.7.

(Continued)

*Primary Examiner* — Jessee R Roe
(74) *Attorney, Agent, or Firm* — Oliff PLC

(57) ABSTRACT

In this steel component, the concentration of C in a surface layer is 0.85 mass % or more to 1.2 mass % or less, which is higher than the concentration of C in a starting material steel, the surface layer has a volume ratio of a retained-austenite structure higher than 0% and lower than 10%, the remainder of the surface layer is a martensitic structure, the area fraction of grain boundary carbides in the surface layer is lower than 2%, a layer inside the surface layer is higher than the surface layer in a volume ratio of a retained-austenite structure, and in the layer inside the surface layer, the remainder is a martensitic structure.

20 Claims, 7 Drawing Sheets

(56) References Cited

U.S. PATENT DOCUMENTS

2012/0247619 A1    10/2012    Obayashi et al.

FOREIGN PATENT DOCUMENTS

| WO | 2006/118243 | A1 | 11/2006 |
| WO | 2011/122650 | A1 | 10/2011 |
| WO | 2011/122651 | A1 | 10/2011 |

OTHER PUBLICATIONS

Jun. 13, 2017 International Search Report issued in International Patent Application No. PCT/JP2017/009186.

TOOTH PROFILE DIRECTION
TOOTH TRACE DIRECTION

FIG. 5

PRODUCING STEPS FOR GEAR COMPONENT (1)

| PROC-ESSING | | PRE-MACHINING | CARBURIZING, COOLING |
|---|---|---|---|
| SCHE-MATIC DIAGRAM | STARTING MATERIAL STEEL (STEEL BAR) | CUTTING, ROUGH MACHINING / FORMING SPLINE TEETH — WORKPIECE | (gear 200, 134, 20, CL1) |
| HEATING PATTERN | (TEMPERATURE) A3 (NORMALIZING) (TIME) | — | (TEMPERATURE) Acm CARBURIZING DIFFUSING / SLOW COOLING (TIME) |

FIG. 6

PRODUCING STEPS FOR GEAR COMPONENT (2)

| PROC-ESSING | HIGH FREQUENCY HARDENING, TEMPERING | SHOTPEENING |
|---|---|---|
| SCHEMATIC DIAGRAM | (gear 300, 34, 35, CL2, 20) | (gear 100, 31, 32, 33, 34, 35, 20) |
| HEATING PATTERN | (TEMPERATURE) Acm 600 HIGH-FREQUENCY HEATING / RAPID COOLING / TEMPERING (TIME) | — |

STEEL COMPONENT, GEAR COMPONENT, AND PRODUCING METHOD FOR STEEL COMPONENT

TECHNICAL FIELD

The present disclosure relates to a steel component and a gear component that are made of steel as a starting material and hardened through steps including carburization and quenching, and relates to a producing method for the steel component.

BACKGROUND ART

There has been known a steel component and a producing method for the steel component in which heat treatment strain is suppressed and hardness is increased by performing carburizing on steel and thereafter cooling the steel once, and performing high-frequency quenching after the cooling. Such a steel component and a producing method for the steel component are disclosed in, for example, International Publication No. 2006/118243 (WO 2006/118243) (related art document).

According to the above related art document, carburizing is performed to increase the concentration of C (carbon) on a surface (surface layer) of the steel, the steel is then cooled at a cooling rate of 4 to 10° C./sec such that a martensitic structure is not produced, and high-frequency quenching is then performed to suppress distortion attributable to heat treatment (heat treatment distortion) from occurring in the steel. In addition, in the high-frequency quenching described in the above related art document, the hardness and the fatigue strength of the surface of the high-frequency-quenched steel component are increased by performing high-frequency heating on the cooled steel to heat the surface layer and thereafter performing quenching to subject a structure of the steel to martensitic transformation. The above related art document further discloses increasing a bending fatigue strength of the high-frequency-quenched steel component by performing tempering and shotpeening on the high-frequency-quenched steel component subjected to the quenching. In addition, an example in the above related art document discloses using a steel material containing a relatively high concentration (0.5% to 2.96%) of Cr for the purpose of increasing temper softening resistance.

Specifically, for example, the above related art document discloses an example where carburizing was performed to set the concentration of C in a surface at 0.6 mass %, and high-frequency quenching and shotpeening were then performed, in embodiment examples 14 and 15 shown in Table 1 of the example.

RELATED ART DOCUMENTS

Patent Documents

Patent Document 1: International Publication No. 2006-118243 (WO 2006-118243)

SUMMARY

Problem to be Solved

However, as to a test material 1 (the embodiment examples 14 and 15) subjected to the shotpeening described in the above related art document, although the concentration of C in the surface subjected to the carburizing was set at 0.6 mass % to increase a surface hardness, components such as gear components requested to have a high surface hardness are demanded to have a further increased surface hardness.

Now, it is generally known that, to increase hardness of steel by performing carburizing, cooling after the carburizing, and quenching on the steel, the higher the concentration of C in a surface (surface layer) subjected to the carburizing, the higher the hardness after the quenching. However, if the concentration of C in the surface is higher than about 0.8% (eutectoid point), a state what is called a hyper eutectoid is brought about, which causes carbides such as cementite to precipitate in a large amount in crystal grain boundaries in cooling after the carburizing for suppressing a strain attributable to heat treatment (heat treatment strain), raising the risk of failing to melt the carbides in high-frequency heating after the cooling, with the result that C (carbon) cannot be dissolved sufficiently in a base material. In addition, if carbon is not dissolved in the base material in the high-frequency heating, there is the risk that cooling after the heating to subject a structure to martensitic transformation fails to obtain a martensitic structure in which a desired amount of C (carbon) is dissolved. In addition, if shotpeening is performed on a carburized and quenched steel in which the concentration of C is in a hyper eutectoid state and carbides such as cementite reside in crystal grain boundaries, the carbides (precipitates) precipitating in the crystal grain boundaries may cause a fine crack (microcrack) to occur on a surface, resulting in deterioration in the fatigue strength and the toughness of a carburized, high-frequency-quenched steel component.

On the other hand, it is also known that, in the carburized and quenched steel in which the concentration of C is in a hyper eutectoid state, even when the carbides are melted, and C (carbon) is dissolved in the base material sufficiently in the heating, a quenched structure undergoes martensitic transformation insufficiently, and a retained austenite amount is large as compared with a steel having a concentration of C lower than the eutectoid point. However, a retained-austenite structure has a low hardness as compared with the martensitic structure, and therefore, to increase the surface hardness of the carburized, high-frequency-quenched steel component, it is necessary to transform the structure from retained austenite into martensite through strain induced transformation by a modifying step such as shotpeening, after the quenching.

Note that, an example 7 of the above related art document discloses a test material in which the concentration of C in a surface is increased to 1.5 mass %, but this test material of the example 7 is not subjected to shotpeening and has a retained austenite amount of 19%, and retained-austenite structures being soft reside in the surface in a large amount. This is considered to be due to a steel material according to the above related art document having a high concentration of C and containing a relatively high concentration (1.05%) of Cr, which causes carbides attributable to Cr to precipitate in a large amount in crystal grain boundaries of the test material subjected to the carburizing, making it difficult to perform the shotpeening for the above reason (the occurrence of a crack).

A preferred embodiment is made to solve problems described above, and an objective of one aspect of a preferred embodiment is to provide a steel component and a gear component in which the heat treatment strain can be suppressed and which enables, even when the concentration of C in a surface layer is higher than the eutectoid point (the surface layer is in a hyper eutectoid state), the deterioration in the fatigue strength attributable to carbides precipitating in crystal grain boundaries can be suppressed, and the hardness of the surface layer can be sufficiently increased, and it is possible to provide a producing method for the steel component.

Means for Solving the Problem

To achieve the above objective, a steel component according to a first aspect of a preferred embodiment is a steel component that is made of a starting material steel including, as chemical components:
C (carbon): 0.05 mass % or more to 0.30 mass % or less;
Si (silicon): 1.0 mass % or more to 3.0 mass % or less;
Mn (manganese): 0.1 mass % or more to 3.0 mass % or less;
P (phosphorus): 0.03 mass % or less;
S (sulfur): 0.001 mass % or more to 0.150 mass % or less;
Cr (chromium): 0.01 mass % or more to 0.20 mass % or less;
Al (aluminum): 0.01 mass % or more to 0.05 mass % or less;
N (nitrogen): 0.003 mass % or more to 0.030 mass % or less; and
Fe, trace amounts of other alloy components as optional components, and unavoidable impurities: a balance, wherein a concentration of C in a surface layer of the steel component is 0.85 mass % or more to 1.2 mass % or less, which is higher than a concentration of C in the starting material steel, the surface layer has a volume ratio of a retained-austenite structure higher than 0% and lower than 10%, a remainder of the surface layer is a martensitic structure, the area fraction of grain boundary carbides in the surface layer is lower than 2%, a layer inside the surface layer has a volume ratio of a retained-austenite structure higher than the volume ratio of the retained-austenite structure in the surface layer, and in the layer inside the surface layer, a remainder is a martensitic structure.

Note that, in the present disclosure, the term "the remainder of a surface layer (or a layer inside the surface layer) is a martensitic structure" is not limited to a case where the remainder other than a retained-austenite structure in the surface layer (or the layer inside the surface layer) is perfectly a martensitic structure, but is a concept including a case where the remainder other than the retained-austenite structure contains unavoidably formed structures other than the retained-austenite structure and the martensitic structure, and grain boundary carbides, in a trace amount. In addition, in the present disclosure, the term "grain boundary carbides" refers to iron-based carbides (e.g., cementite) and alloy carbides that precipitate in austenite grain boundaries in producing the steel component.

In the steel component according to the first aspect of a preferred embodiment, as described above, by setting the concentration of C in the surface layer at 0.85 mass % or more (what is called a hyper eutectoid state), it is possible to increase the hardness of the surface layer more than a case where the concentration of C in the surface layer is 0.6 mass %. In addition, in the steel component according to the first aspect, the surface layer is structured such that the concentration of C in the surface layer is set at 1.2 mass % or less, the volume ratio of the retained-austenite structure in the surface layer is higher than 0% and lower than 10%, and the remainder of the surface layer is a martensitic structure. Furthermore, in addition to setting the concentration of C in the surface layer at 1.2 mass % or less, in the starting material steel, the concentration of Si is set at 1.0 mass % or more, and the concentration of Cr is set at 0.20 mass % or less. With these concentrations, the area fraction of grain boundary carbides in the surface layer can be set at lower than 2%, so that the deterioration in the fatigue strength of the steel component attributable to the grain boundary carbides can be suppressed. As a result, it is possible to suppress the steel component from being broken, which allows the lifetime of the steel component to be increased. Moreover, unlike a case where the concentration of C in the surface layer is 1.5 mass %, the austenitic structure being soft (retained-austenite structure) can be suppressed from being retained in the surface layer by 10% or more, so that the Vickers hardness of the surface layer can be sufficiently increased to HV800 or higher. In addition, in the steel component, in a case of performing carburizing (heat treatment) on the steel component in order to set the concentration of C in the surface layer at 0.85 mass % or more to 1.2 mass % or less, a strain is likely to occur due to heat in the carburizing (heat treatment strain). In such a case, by cooling, after the carburizing, the steel component at a cooling rate lower than a cooling rate at which the steel component undergoes martensitic transformation, a strain attributable to the heat treatment (heat treatment strain) can be suppressed from occurring in the steel component. As a result, it is possible to provide a steel component in which the heat treatment strain can be suppressed and that enables, even when the concentration of C in the surface layer is higher than the eutectoid point (the surface layer is in a hyper eutectoid state), the deterioration in the fatigue strength attributable to carbides precipitating in crystal grain boundaries can be suppressed, and the hardness of the surface layer can be sufficiently increased.

In a producing method for a steel component according to a second aspect of a preferred embodiment, the steel component is made of a starting material steel containing, as chemical components:
C (carbon): 0.05 mass % or more to 0.30 mass % or less;
Si (silicon): 1.0 mass % or more to 3.0 mass % or less;
Mn (manganese): 0.1 mass % or more to 3.0 mass % or less;
P (phosphorus): 0.03 mass % or less;
S (sulfur): 0.001 mass % or more to 0.150 mass % or less;
Cr (chromium): 0.01 mass % or more to 0.20 mass % or less;
Al (aluminum): 0.01 mass % or more to 0.05 mass % or less;
N (nitrogen): 0.003 mass % or more to 0.030 mass % or less; and
Fe, and trace amounts of other alloy components as optional components, and unavoidable impurities: a balance, the producing method includes:
a carburizing step of performing carburizing on the steel component such that a concentration of C in a surface and a proximity of the surface of the steel component is 0.85 mass % or more to 1.2 mass % or less that is higher than a concentration of C in the starting material steel;
a cooling step of, after the carburizing step, cooling the steel component at a cooling rate lower than a cooling rate at which the steel component undergoes martensitic transformation;
a quenching step of, after the cooling step, making part of an austenitic structure in the steel component into martensite by performing high-density energy heating to heat the steel component to a temperature equal to or higher than an austenitizing temperature, and then performing quenching by cooling the steel component being austenitized at a cooling rate equal to or higher than the critical cooling rate at which martensitic transformation occurs; and a modifying step of, after the quenching step, making a layer inside a surface layer higher than the surface layer in a volume ratio of a retained-austenite structure, and making a remainder into a martensitic structure, by applying mechanical energy to a surface and a proximity of the surface of the steel component to modify the austenitic structure in the steel component into a martensitic structure.

In the producing method of a steel component according to the second aspect of a preferred embodiment, in order to increase the hardness of the surface after the quenching, the concentration of C in the surface layer is set at 0.85 mass % or more to 1.2 mass % or less, which is higher than the concentration of C at an eutectoid point, and in order to transform the retained-austenite structure present in the surface and a proximity of the surface of the steel component subjected to the quenching into the martensitic structure, the mechanical energy is applied. Here, in the carburizing step, when the concentration of C in the surface layer is set at 0.85 mass % or more, which is higher than the concentration of C at the eutectoid point, carbides such as cementite are likely to be generated in crystal grain boundaries in the cooling step subsequent to the carburizing step, but use is made of a starting material steel in which, regarding to Si for suppressing the generation of the carbides, the concentration of Si is set at 1.0 mass % or more, and regarding to Cr likely to promote the generation of the carbides, the concentration of Cr is set at 0.20 mass % or less, to suppress the generation of the carbides. As a result, the Vickers hardness of the surface layer can be sufficiently increased to, for example, HV800 or higher, and the generation of the carbides can be suppressed to set the area fraction of the grain boundary carbides at, for example, lower than 2% in the surface layer, so that it is possible to suppress the deterioration in fatigue strength of the steel component attributable to the grain boundary carbides. As a result, it is possible to suppress the steel component from being broken, which allows the lifetime of the steel component to be increased.

Furthermore, in the producing method for a steel component according to the second aspect, the part of the austenitic structure in the steel component is made into martensite by performing high-density energy heating to heat the steel component to the temperature equal to or higher than the austenitizing temperature, and then performing quenching by cooling the steel component being austenitized at the cooling rate equal to or higher than the critical cooling rate (rapid cooling). Here, for example, in a case of performing the rapid cooling (quenching) using coolant at about 10° C. or higher to about 40° C. or lower, a larger portion of the austenitic structure in the steel component can be made into martensite than in a case of performing cooling using coolant at about 80° C. or higher to about 180° C. or lower (for example, oil quenching), so that the volume ratio of a retained-austenite structure in the steel component can be reduced. This is clear from a graph illustrated in FIG. 7 to be described later (a graph illustrating an example of rapid cooling and slow cooling, and illustrating the volume ratios of the retained-austenite structure in a case of performing the rapid cooling using coolant at 25° C. and in a case of performing the slow cooling using coolant at 140° C.). As a result, it is possible to reliably reduce the volume ratio of the retained-austenite structure in the surface layer subjected to the modifying step.

In addition, in the producing method for a steel component according to the second aspect, after the carburizing step, the steel component is cooled at the cooling rate lower than the cooling rate at which the steel component undergoes martensitic transformation. As a result, even when the carburizing (heat treatment) is performed on the steel component, since the steel component is cooled in the subsequent cooling step at the cooling rate lower than the cooling rate at which the steel component undergoes martensitic transformation, and it is possible to suppress a strain attributable to the heat treatment (heat treatment strain) from occurring in the steel component.

Effects

According to aspects of preferred embodiments, as described above, it is possible to provide a steel component and a gear component in which the heat treatment strain can be suppressed and which enables, even when the concentration of C in a surface layer is higher than the eutectoid point (the surface layer is in a hyper eutectoid state), the deterioration in the fatigue strength attributable to carbides precipitating in crystal grain boundaries can be suppressed, and in which the hardness of the surface layer can be sufficiently increased, and it is possible to provide a producing method for the steel component.

BRIEF DESCRIPTION OF THE DRAWINGS

FIG. 5 is a diagram used for describing producing steps for the gear component according to the first embodiment.

FIG. 6 is a diagram used for describing producing steps for the gear component according to the first embodiment.

BEST MODES

Figure 1:
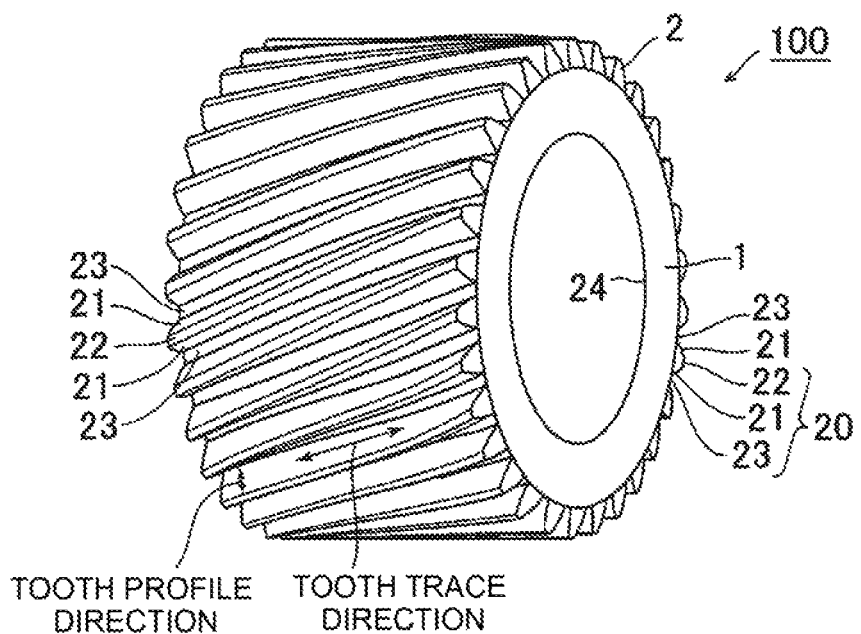
FIG. 1 is a perspective view illustrating a gear component according to a first embodiment.

Hereafter, embodiments will be described.

First Embodiment

[Composition of Starting Material Steel]

First, description will be made about a composition of a starting material steel used for a gear component 100 according to a first embodiment. Note that the starting material steel contains the following composition as well as the balance Fe (iron) and unavoidable impurities. In addition, the gear component 100 is an example of a "steel component" described in the scope of claims.

(C (carbon): 0.05 mass % or more to 0.30 mass % or less)

C is an element to be added for ensuring hardness of the starting material steel. Hence, in the first embodiment, the hardness of the starting material steel is ensured by setting a lower limit of the concentration of C at 0.05 mass %. On the other hand, a concentration of C more than 0.30 mass % makes the hardness of the starting material steel higher than required, and as a result, in the starting material steel, toughness deteriorates and machinability deteriorates. For that reason, 0.30 mass % was set as an upper limit of the concentration of C. In terms of ensuring the hardness of the starting material steel, a more preferable range of the concentration of C is about 0.15 mass % or more to 0.30 mass % or less.

(Si (silicon): 1.0 mass % or more to 3.0 mass % or less)

Si is an element to be added for suppressing carbides from precipitating in crystal grain boundaries in slow cooling after carburizing, which will be described later, and for suppressing the hardness from deteriorating through tempering martensitic structures. Adding Si suppresses grain boundary carbides from precipitating, and therefore structures in which C (carbon) is sufficiently dissolved can be obtained in high-density energy heating performed after the carburizing. This suppresses deterioration in fatigue strength attributable to the grain boundary carbides. Note that, in the first embodiment, setting a lower limit of a Si concentration at 1.0 mass % ensures such a concentration of Si that enables carbides to be suppressed from precipitating in crystal grain boundaries. In contrast, a concentration of Si more than 3.0 mass % makes the hardness of the starting material steel higher than required, and as a result, in the starting material steel, machinability deteriorates. For that reason, 3.0% mass % is set as an upper limit of the concentration of Si. In terms of suppressing the grain boundary carbides from precipitating and suppressing toughness and machinability from lowering, the range of the concentration of Si is more preferably 1.0 mass % or more to about 2.5 mass % or less, still more preferably about 1.5 mass % or more to about 2.0 mass % or less. Note that Si is also effective for deoxidation in a steelmaking step.

(Mn (manganese): 0.1 mass % or more to 3.0 mass % or less)

Mn is an element effective for deoxidation in a steelmaking step and for increasing hardenability. To obtain this effect, the concentration of Mn has to be 0.1 mass % or more. In contrast, a concentration of Mn more than 3.0 mass % makes the hardness of the starting material steel higher than required, and as a result, in the starting material steel, machinability deteriorates. For that reason, 3.0% mass % was set as an upper limit of the concentration of Mn. In terms of suppressing deterioration in the hardenability and machinability, a more preferable range of the concentration of Mn is about 0.4 mass % or more to about 2.0 mass % or less.

(P (phosphorus): 0.03 mass % or less)

P segregates in crystal grain boundaries, causing deterioration in strength of the crystal grain boundaries and deterioration in toughness of the starting material steel, and it is therefore necessary to minimize P. Specifically, it is necessary to decrease the concentration of P to 0.03 mass % or less.

(S (sulfur): 0.001 mass % or more to 0.150 mass % or less)

Forming MnS in the starting material steel, S is an element effective for increasing machinability of the starting material steel. To obtain this effect, the concentration of S has to be 0.001 mass % or more. However, a concentration of S more than 0.150 mass % causes MnS to segregate in crystal grain boundaries, resulting in deterioration in toughness of the starting material steel, and thus 0.150 mass % was set as an upper limit of a S concentration. In terms of increasing the machinability and suppressing deterioration in the toughness, a more preferable range of the concentration of S is about 0.005 mass % or more to about 0.060 mass % or less.

(Cr (chromium): 0.01 mass % or more to 0.20 mass % or less)

Cr is an element effective for increasing hardenability and temper softening resistance. To obtain this effect, the concentration of Cr has to be 0.01 mass % or more. In contrast, a concentration of Cr more than 0.20 mass % causes grain boundary carbides to precipitate in a large amount through cooling after the carburizing. If this grain boundary carbides precipitate in a large amount, obtaining a structure in which C (carbon) is sufficiently dissolved fails in the high-density energy heating after the carburizing, resulting in deterioration in fatigue strength of the steel component. For that reason, 0.20 mass % was set as an upper limit of the concentration of Cr. In terms of increasing hardenability and temper softening resistance and of suppressing precipitation of the grain boundary carbides, a more preferable range of the concentration of Cr is about 0.05 mass % or more to about 0.15 mass % or less.

(Al (aluminum): 0.01 mass % or more to 0.05 mass % or less)

Al precipitates and disperses in the form of its nitride in a workpiece to suppress a structure from coarsening in the carburizing and the high-density energy heating, and is therefore an element effective for refining a structure. To obtain this effect, the concentration of Al has to be 0.01 mass % or more. However, a concentration of Al more than 0.05 mass % makes nitride being precipitate likely to be coarsened, and therefore 0.05 mass % was set as an upper limit of the Al concentration. In terms of refining the structure, a more preferable range of the concentration of Al is about 0.02 mass % or more to 0.04 mass % or less.

(N (nitrogen): 0.003 mass % or more to 0.030 mass % or less)

N forms various nitrides with Al and the like to suppress a structure from coarsening in the carburizing and the high-density energy heating, and is therefore an element effective for refining a structure. To obtain this effect, the concentration of N has to be 0.003 mass % or more. However, a concentration of N more than 0.030 mass % results in deterioration in forgeability of the starting material steel, and therefore 0.030 mass % was set as an upper limit of the concentration of N. In terms of refining the structure and suppressing the deterioration in forgeability, a more preferable range of the concentration of N is about 0.005 mass % or more to about 0.020 mass % or less.

In addition, the starting material steel may contain one or two of the following elements as optional alloy components.

Mo (molybdenum): about 0.01 mass % or more to about 0.50 mass % or less.

B (boron): about 0.0006 mass % or more to about 0.0050 mass % or less.

Mo and B are elements effective for increasing strength of crystal grain boundaries and increasing hardenability and may be contained in a trace amount in the starting material steel for the purpose of increasing strength of a structure. To obtain this effect, the concentrations of the respective elements have to be the above respective lower-limit values or more. However, when the elements are added at concentrations more than the above respective upper-limit values, the effect is saturated, and it is therefore preferable not to add the elements at concentrations more than the above upper-limit values. Note that, in terms of increasing strength of crystal grain boundaries and hardenability, a more preferable range of the concentration of Mo and a more preferable range of the concentration of B are, respectively, about 0.03 mass % or more to about 0.20 mass % or less and about 0.0010 mass % or more to about 0.0030 mass % or less.

In addition, the starting material steel may contain one or two of the following elements as optional alloy components.

Nb (niobium): about 0.01 mass % or more to about 0.30 mass % or less.

Ti (titanium): about 0.005 mass % or more to about 0.200 mass % or less.

V (vanadium): about 0.01 mass % or more to about 0.20 mass % or less.

Nb, Ti, and V are elements effective for suppressing a structure from coarsening and may be contained in the starting material steel a trace amount for the purpose of increasing strength of the structure. To obtain this effect, the concentrations of the elements have to be the above respective lower-limit values or more. However, when the elements are added at concentrations more than the above respective upper-limit values, the effect is saturated, and it is therefore preferable not to add the elements at concentrations more than the above upper-limit values. Note that, in terms of suppressing the structure from coarsening, more preferable ranges of the concentration of Nb, the concentration of Ti, and the concentration of V are, respectively, about 0.03 mass % or more to about 0.20 mass % or less, about 0.030 mass % or more to about 0.100 mass % or less, and about 0.03 mass % or more to about 0.10 mass % or less. Here, the starting material steel may contain any one of Mo and B, and any one or two elements of Nb, Ti, and V. It is thereby possible to increase the strength of the structure from the both viewpoints of increasing the strength of crystal grain boundaries and increasing the hardenability, and of suppressing the structure from coarsening.

[Structure of Gear Component]

Next, the gear component 100 according to the first embodiment will be described with reference to FIG. 1 to FIG. 3.

Figure 2:
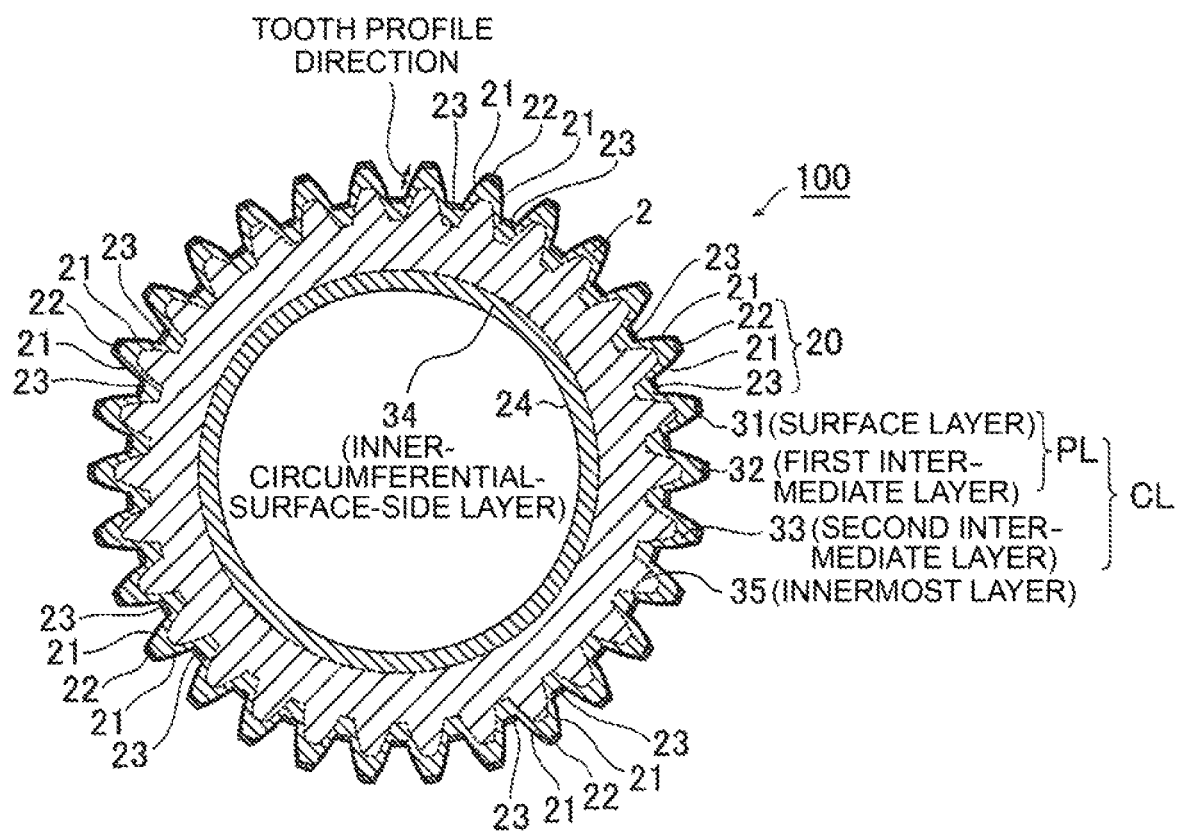
FIG. 2 is a sectional view of the gear component according to the first embodiment.

The gear component 100 according to the first embodiment fabricated by working the above starting material steel is what is called a pinion as illustrated in FIG. 1. This gear component 100 is fabricated by performing rough machining and gear cutting machining as machining processing and thereafter performing carburizing, cooling, high-frequency quenching, tempering, and shotpeening in this order. Note that the processing will be described in detail in description about a producing step. In addition, the shotpeening is an example of a "modifying treatment" described in the scope of claims.

In the gear component 100, a tooth portion 2 is provided on an outer circumferential surface 20 side of a tubular member 1. The tooth portion 2 includes a plurality of teeth each protruding outwardly. The tooth portion 2 includes a plurality of tooth flanks 21, tip surfaces 22, and root surfaces 23, each inclining against the direction to which the tubular member 1 extends and extending along a tooth trace direction. In addition, as illustrated in FIG. 2, the tooth flanks 21 are each formed so as to extend in a tooth profile direction to connect the tip surface 22 and the root surface 23.

Figure 3:
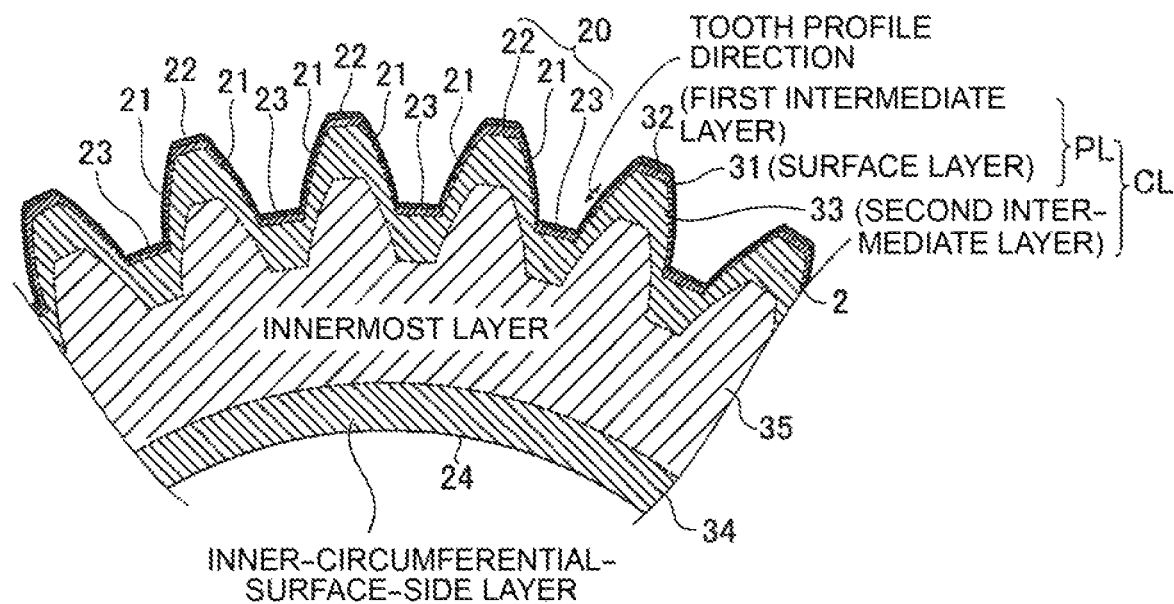
FIG. 3 is an enlarged sectional view of the gear component according to the first embodiment.

As illustrated in FIG. 3, on the outer circumferential surface 20 side of the gear component 100, an outer circumferential surface 20 (the tooth flanks 21, the tip surfaces 22, and the root surfaces 23), a surface layer 31 provided in a proximity of the outer circumferential surface 20, an first intermediate layer 32 laying inside the surface layer 31, and a second intermediate layer 33 laying inside the first intermediate layer 32 are formed. In addition, in the gear component 100, an inner-circumferential-surface-side layer 34 is formed on an inner circumferential surface 24 and in a proximity of the inner circumferential surface 24. In addition, in the gear component 100, an innermost layer 35 is formed in a region inside the gear component 100, namely, between the second intermediate layer 33 and inner-circumferential-surface-side layer 34.

The surface layer 31 is a region that is treated by carburizing, cooling, high-frequency quenching, tempering, and shotpeening. Specifically, the surface layer 31 is a region at depths from about 20 µm or more and about 40 µm or less from the outer circumferential surface 20 in a perpendicular direction to the outer circumferential surface 20. Note that the depth of the surface layer 31 can be changed according to conditions of the shotpeening or the like.

Here, in the first embodiment, the tooth flanks of the surface layer 31 that are to be in mash with another gear are subjected to the carburizing to have a concentration of C set at 0.85 mass % or more to 1.2 mass % or less. This concentration of C is higher than the concentration of C in the starting material steel (0.05 mass % or more to 0.30 mass % or less).

Figure 4:
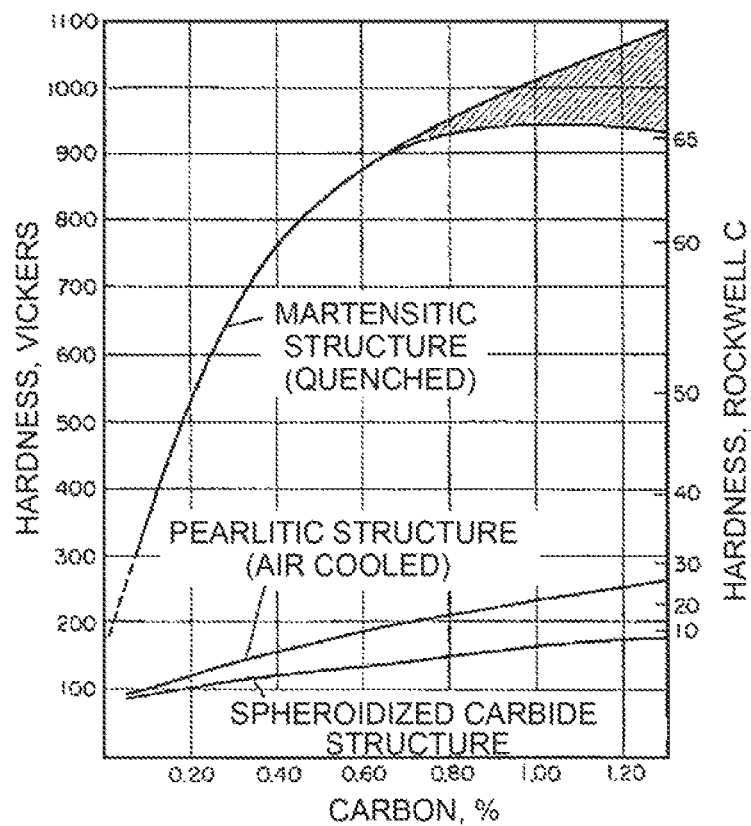
FIG. 4 is a graph illustrating a relation between the concentration of C and the hardness of a steel material.

In addition, by the concentration of C in the surface layer 31 being 0.85 mass % or more, hardness can be more sufficiently increased than in a case where the concentration of C in the surface layer is as low as 0.6 mass %, according to the relation between the concentration of C and the hardness of a steel material illustrated in FIG. 4 (E. C. Bain and H. W. Paxton, Alloying Elements in Steel, 2nd ed., American Society for Metals, Metals Park, Ohio, 1961). In contrast, a C concentration in the surface layer more than 1.2 mass % causes a retained-austenite structure to be retained in a large amount in the high-frequency quenching to be described later, and therefore an upper limit of the concentration of C in the surface layer 31 is 1.2 mass %. Note that the concentration of C in the surface layer 31 is preferably 0.85 mass % or more to about 1.1 mass % or less, more preferably about 0.9 mass % or more to about 1.05 mass % or less.

In addition, in the first embodiment, the surface layer 31 includes a retained-austenite structure and a martensitic structure. In addition, in the surface layer 31, the volume ratio of the retained-austenite structure is higher than 0% and lower than 10%, and the remainder is the martensitic structure. Note that it suffices that the surface layer 31 is largely made of an austenitic structure and a martensitic structure, and in addition to the austenitic structure and the martensitic structure, a trace quantity of unavoidable structures (e.g., a cementite structure and a bainitic structure) and the like may be included. Accordingly, in the surface layer 31, a residual amount of the austenitic structure, which is soft, is as small as less than 10%, and the remainder is a martensitic structure, so that the gear component 100 including the surface layer 31 having a high hardness can be obtained. Note that the martensitic structure used herein includes a martensitic structure as transformed through quenching, as well as a tempered-martensite structure subjected to tempering after quenching.

In addition, in the surface layer 31, the retained-austenite structure and the martensitic structure are both formed to have an area fraction of grain boundary carbides of lower than 2%. Note that, the area fraction of grain boundary carbides can be obtained by observation on a cross section having a predetermined area or larger (e.g., an area of 10000 μm² or larger) and calculating a ratio of an area of grain boundary carbides existing in the cross section.

In addition, in the first embodiment, in the starting material steel, an addition amount of Si is increased and an addition amount of Cr is reduced to suppress the occurrence of pro-eutectoid cementite in crystal grain boundaries in cooling after carburizing.

In addition, the martensitic structure includes a martensitic structure generated on the surface layer 31 by rapid cooling in high-frequency quenching, and a martensitic structure generated by modifying a retained-austenite structure retained in the high-frequency quenching with mechanical energy applied on the surface layer 31. Note that, in the first embodiment, the mechanical energy is applied to the surface layer 31 through the shotpeening.

In addition, due to the mechanical energy applied on the surface layer 31 through shotpeening, a compressive residual stress of about 600 MPa or higher occurs in the surface layer 31. Note that it is preferable that a compressive residual stress of about 1100 MPa or higher occur in the surface layer 31. Furthermore, through carburizing, high-frequency quenching, and shotpeening, a hardness (Vickers hardness) of HV800 or higher is set in the surface layer 31. Note that it is preferable that the Vickers hardness of the surface layer be HV850 or higher.

The first intermediate layer 32 is a region that is treated by carburizing, cooling, high-frequency quenching, tempering, and shotpeening. Note that the depth of the first intermediate layer 32 can be changed according to conditions of the shotpeening or the like.

In the first intermediate layer 32, the concentration of C is set higher than the concentration of C in the starting material steel through the carburizing. In addition, in the first intermediate layer 32, a retained-austenite structure and a martensitic structure are mainly generated by the high-frequency quenching, and a small portion of the retained-austenite structure is transformed (modified) to a martensitic structure through the shotpeening. As a result, in the first intermediate layer 32, the volume ratio of a retained-austenite structure is higher than that in the surface layer 31, and the remainder is a martensitic structure.

In addition, in a layer in the first intermediate layer 32 that is near the surface layer 31, the volume ratio of the retained-austenite structure is about 15% or higher. In addition, through the shotpeening, a compressive residual stress higher than those in the second intermediate layer 33 and the innermost layer 35 occurs in the first intermediate layer 32.

Note that the surface layer 31 and the first intermediate layer 32 form a peening-treated layer PL that is treated by the shotpeening.

The second intermediate layer 33 is a region that is treated by carburizing, cooling, high-frequency quenching, and tempering. For example, the second intermediate layer 33 is a region inside the first intermediate layer 32 and at depths from about 0.5 mm or more to about 1.5 mm or less from the outer circumferential surface 20 in a perpendicular direction to the outer circumferential surface 20. The inner-circumferential-surface-side layer 34 is a region at depths from about 0.5 mm or more to about 1.5 mm or less from the inner circumferential surface 24 in a perpendicular direction to the inner circumferential surface 24. Note that the depth of the second intermediate layer 33 can be changed according to conditions of the carburizing or the like. In the second intermediate layer 33, the concentration of C is set higher than the concentration of C in the starting material steel through the carburizing. Note that the surface layer 31, the first intermediate layer 32, and the second intermediate layer 33 form a carburizing-treated layer CL that is treated by the carburizing treatment.

The innermost layer 35 is a region that is treated by heat treatment in carburizing, cooling, high-frequency quenching. Specifically, the innermost layer 35 is a layer whose concentration of C changes little from that of the starting material steel before the processing although being subjected to the heat treatment through the carburizing. The hardness of the innermost layer 35 is higher than the hardness of the starting material steel before the processing. Note that the high-frequency quenching is performed over the entire gear component 100.

[Producing Method for Gear Component]

Next, a producing method for the gear component 100 according to the first embodiment will be described with reference to FIG. 1 to FIG. 3 and FIG. 5 to FIG. 7.

(Preparation and Pre-Machining Processing)

First, as illustrated in FIG. 5, a starting material steel (steel bar) having the above composition is prepared. This starting material steel is subjected to normalizing by being heated to a temperature higher than an A3 transformation point (austenite-ferrite transformation temperature) corresponding to the concentration of C (any of concentrations of C of 0.05 mass % or more to 0.30 mass % or less) in the starting material steel.

The starting material steel is then cut to have a predetermined length and thereafter subjected to rough machining to be formed in a tubular shape, and spline teeth are formed on an outer circumferential surface 20 of a workpiece (a steel material resulting from machining on the starting material steel) (see FIG. 2) (pre-machining processing). At this point, the entire workpiece is mainly made of a ferrite structure and a pearlite structure.

(Carburizing and Cooling)

Subsequently, carburizing is performed on the workpiece subjected to the pre-machining processing. In this carburizing, C (carbon) is permeated and diffused in the workpiece in a carburizing furnace (not illustrated) under a reduced-pressure environment with a low oxygen concentration. In other words, vacuum carburizing is performed on the workpiece. Here, a carburization time and a diffusion time of the carburizing with a hydrocarbon gas introduced into the carburizing furnace is determined in consideration of the concentration of C in the surface layer 31 (see FIG. 3) after the gear component 100 is completed.

With this determination, C (carbon) is permeated and diffused from the outer circumferential surface 20, so that a carburized layer CL1 and an inner-circumferential-surface-side layer each having a concentration of C higher than the concentration of C in the starting material steel are formed. Note that in a portion of the carburized layer CL1 that is near the outer circumferential surface 20 (a portion corresponding to the surface layer 31 of the completed gear component 100), the concentration of C is set at 0.85 mass % or more to 1.2 mass % or less. At this point, an entire workpiece 200 is mainly made of an austenitic structure.

Thereafter, in the carburizing furnace under the reduced-pressure environment, the austenitized workpiece 200 is cooled at a cooling rate lower than a critical cooling rate at which martensitic transformation occurs (slow cooling) (cooling step). Consequently, surface-side portions (the outer circumferential surface 20 and an inner circumferential surface) of the workpiece 200 are mainly made of a pearlite structure and a ferrite structure increases toward the inside. Here, in the surface-side portions of the workpiece 200, the C concentration is high, and grain boundary carbides such as cementite are likely to precipitate in crystal grain boundaries. If these grain boundary carbides precipitate in crystal grain boundaries in excess amounts, a structure in which C is sufficiently dissolved cannot be obtained in the high-frequency quenching performed later, causing not only deterioration in hardness due to lack of C (a poor hardness of a martensitic structure after transformation) but also deterioration in fatigue strength of the workpiece. Hence, in the first embodiment, in the starting material steel, the precipitation of grain boundary carbides in crystal grain boundaries is suppressed by setting the concentration of Si at as high as 1.0 mass % or more to 3.0 mass % or less and setting the concentration of Cr at as low as 0.01 mass % or more to 0.20 mass % or less.

In addition, in the cooling step, the austenitized workpiece 200 is cooled at a cooling rate lower than the critical cooling rate at which martensitic transformation occurs (slow cooling), so that a martensitic structure larger in volume than a pearlite structure is suppressed from being generated in the workpiece 200. As a result, strain attributable to the heat treatment (heat treatment strain) is suppressed from occurring in the workpiece 200.

(High-Frequency Quenching and Tempering)

Next, the high-frequency quenching is performed on the workpiece 200 subjected to the carburizing and the cooling. First, as illustrated in FIG. 6, the workpiece 200 is heated by high-density energy heating. Specifically, a high density energy at a predetermined high frequency (e.g., a frequency of about 10 kHz or about 100 kHz) is intensively applied to the workpiece 200, so that induction heating is performed on the workpiece 200. At this point, the heating is performed on the entire workpiece 200 to cause such a temperature rise that the temperature of the workpiece 200 reaches not less than an Acm transformation point. Note that the Acm transformation point is an austenitizing temperature corresponding to the concentration of C of a portion of the carburized layer CL1 that is near the outer circumferential surface 20. As a result, the entire workpiece 200 is mainly made of an austenitic structure.

Thereafter, the workpiece 200 is subjected to rapid cooling. Specifically, water (a coolant) at about 10° C. or higher to about 40° C. or lower is directly brought into contact with the workpiece 200 to cool the workpiece 200. For example, the coolant at about a room temperature (about 25° C.) is used to cool the workpiece 200. Consequently, a workpiece 300 is formed in which part of an austenitic structure is transformed into a martensitic structure (quenched martensite structure) in surface-side portions (the outer circumferential surface 20 and the inner circumferential surface side). Note that, in the workpiece 300, the carburized layer CL1 subjected to the carburizing is quenched to harden into a carburized layer CL2, and in the carburized layer CL2, the innermost layer 35 having a hardness higher than that of the starting material steel is formed. In addition, an inner-circumferential-surface-side layer 134 is quenched to harden into the inner-circumferential-surface-side layer 34. In addition, at this point, based on the concentration of C and the coolant temperature, part of an austenitic structure is transformed into a martensitic structure, and the remainder is retained in a form of an austenitic structure (retained-austenite structure).

Figure 7:
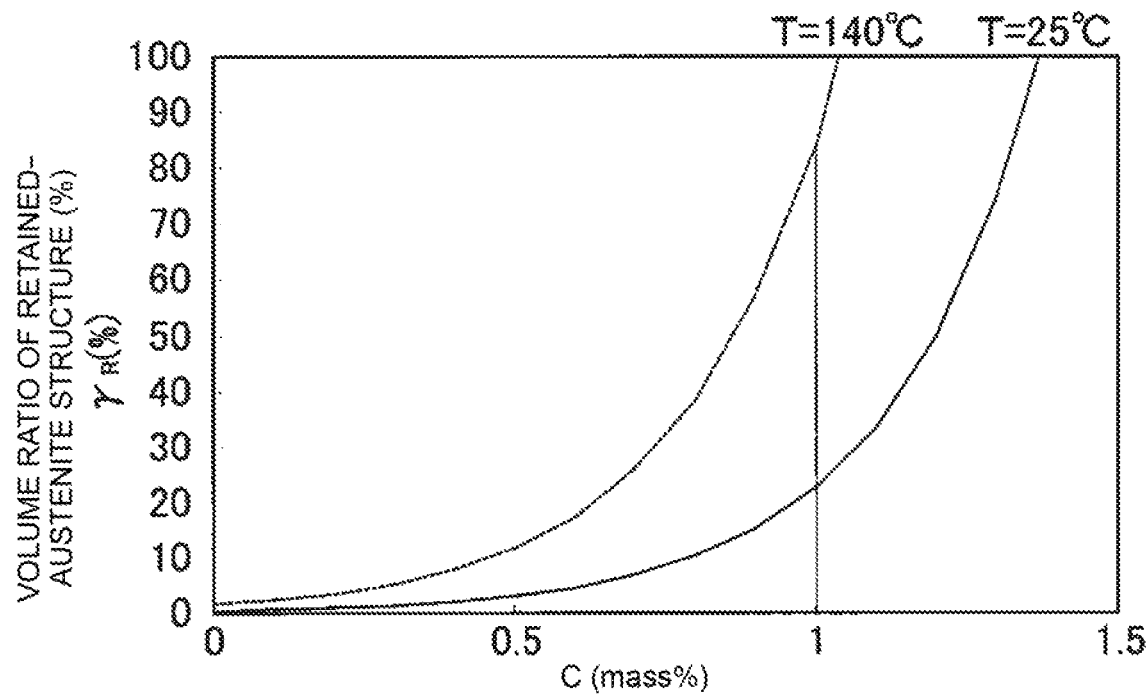
FIG. 7 is a graph illustrating a relation between the concentration of C and the volume ratio of a retained-austenite structure at given coolant temperatures.

Here, FIG. 7 shows a graph illustrating a relation between the concentration of C and the volume ratio of a retained-austenite structure at given coolant temperatures. From this graph, it can be confirmed that a high concentration of C is likely to increase the volume ratio of the retained-austenite structure ($\gamma_R$).

Here, in a case of oil cooling, the coolant temperature is about 140° C., which is high and is likely to increase the volume ratio of the retained-austenite structure ($\gamma_R$) to the concentration of C. In contrast to this, in a case of the water cooling according to the first embodiment, since the temperature of the coolant is as low as about 25° C., the volume ratio of the retained-austenite structure can be reliably suppressed from increasing even when the concentration of C is 0.85 mass % or more to 1.2 mass % or less.

For example, in a case of a concentration of C of 1.0 mass %, using the oil cooling (the coolant temperature T=140° C.) increases the volume ratio of the retained-austenite structure ($\gamma_R$) to more than 80%. In this case, the volume ratio of the retained-austenite structure considerably exceeds a ratio at which the modification is enabled through the shotpeening to be performed later, and therefore the retained-austenite structure is retained in a large amount after the shotpeening, resulting in a low hardness of the surface layer. In contrast, in the case of the concentration of C of 1.0 mass %, using the water cooling (the coolant temperature T=25° C.) can control the volume ratio of the retained-austenite structure ($\gamma_R$) to about 25%. As a result, the amount of the retained-austenite structure retained after the shotpeening can be reduced.

Then, as illustrated in FIG. 6, the workpiece 300 is heated to a temperature lower than about 600° C. to be tempered.

Note that, through the high-frequency quenching and the tempering, a portion of the carburized layer CL2 that is near the outer circumferential surface 20 (portion corresponding to the surface layer 31 of the completed gear component 100) has an increased hardness as well as an ensured toughness. However, the hardness of the portion of the carburized layer CL2 that is near the outer circumferential surface 20 is insufficient under an influence of the retained-austenite structure.

(Shotpeening)

Finally, the shotpeening (modifying step) is performed on the outer circumferential surface 20 of the workpiece 300. Specifically, with the workpiece 300 rotated, media (blast media) are shot at the outer circumferential surface 20 of the workpiece 300 at a predetermined pressure. At this point, as a first phase, the media are shot at the outer circumferential surface 20 of the workpiece 300. As a result, mechanical energy is applied to a deep portion of the carburized layer CL2. Subsequently, as a second phase, media having smaller diameter than the media used in the first phase are shot at the outer circumferential surface 20 of the workpiece 300. As a result, mechanical energy is applied to the portion of the carburized layer CL2 that is near the outer circumferential surface 20. Through these phases, in the portion of the carburized layer CL2 that is near the outer circumferential surface 20, part of the retained-austenite structure is modified to be transformed into a martensitic structure. Consequently, the portion of the carburized layer CL2 that is near the outer circumferential surface 20 is made into the surface layer 31 including the retained-austenite structure at a volume ratio of higher than 0% to lower than 10% and the martensitic structure being the remainder.

At this point, in the carburized layer CL2 corresponding to the surface layer 31, the retained-austenite structure ($\gamma_R$) is suppressed from increasing in volume ratio in a state before the shotpeening, so that the amount (volume) of the modification from the retained-austenite structure into the martensitic structure can be suppressed in the subsequent shotpeening. Accordingly, the martensitic structure modified from the retained-austenite structure can be sufficiently generated in the surface layer 31 under typical conditions for the shotpeening, without need of setting a mechanical energy amount (the magnitude of the shooting pressure of the media) and treatment time to large values especially in the shotpeening.

In addition, a portion of the carburized layer CL2 that is inside the surface layer 31 is formed into the first intermediate layer 32 as a layer to which the mechanical energy is applied through the shotpeening. Here, in the first intermediate layer 32 inside the surface layer 31, the volume ratio of the retained-austenite structure is higher than that in the surface layer 31, and the remainder is a martensitic structure. In addition, a portion of the carburized layer CL2 that is inside the first intermediate layer 32 is formed into the second intermediate layer 33 as a layer to which the mechanical energy is not applied through the shotpeening. In addition, through these phases of the shotpeening, compressive residual stress occurs in the surface layer 31 and the first intermediate layer 32 (peening-treated layer PL).

In addition, to level off (flatten) projections and depressions formed on the outer circumferential surface 20 through the shotpeening, finish processing such as mirror finish may be performed on the outer circumferential surface 20 after the shotpeening. Note that the mirror finish can be performed by polishing using a grindstone. As a result, the gear component 100 illustrated in FIG. 1 to FIG. 3 is fabricated.

[Effects of First Embodiment]

According to the first embodiment, the following effects can be obtained.

In the first embodiment, as described above, by setting the concentration of C in the surface layer 31 at 0.85 mass % or more, the hardness of the surface layer 31 can be increased more than in a case where the concentration of C in the surface layer is 0.6 mass %. In addition, the surface layer 31 is structured such that the concentration of C in the surface layer 31 is set at 1.2 mass % or less, the volume ratio of the retained-austenite structure in the surface layer 31 is higher than 0% and less than 10%, and the remainder of the surface layer 31 is a martensitic structure. Furthermore, in addition to setting the concentration of C in the surface layer 31 at 1.2 mass % or less, in the starting material steel, the concentration of Si is set at 1.0% mass % or more, and the concentration of Cr is set at 0.20 mass % or less. With these concentrations, the area fraction of grain boundary carbides in the surface layer 31 can be set at lower than 2%, so that the deterioration in fatigue strength of the gear component 100 attributable to the grain boundary carbides can be suppressed. As a result, the gear component 100 can be suppressed from being broken, which allows the lifetime of the gear component 100 to be increased. Moreover, unlike a case where the concentration of C in the surface layer 31 is 1.5 mass %, the austenitic structure, which is soft, (retained-austenite structure) can be suppressed from being retained in the surface layer 31 by 10% or more, so that the Vickers hardness of the surface layer 31 can be sufficiently increased to HV800 or higher.

In addition, in the first embodiment, as described above, when the concentration of C in the surface layer 31 is set at about 0.9 mass % or more, the hardness of the surface layer 31 can be increased more effectively.

Moreover, in the first embodiment, as described above, when the concentration of C in the surface layer 31 is set at about 1.1 mass % or less, the retained-austenite structure, which is soft, can be suppressed from being retained in the surface layer 31 in a large amount, and carbides can be suppressed from precipitating in crystal grain boundaries.

In addition, in the first embodiment, as described above, a layer in the first intermediate layer 32 that is near the surface layer 31 includes the austenitic structure at a volume ratio of about 15% or higher. It is thereby possible to increase the hardness of the first intermediate layer 32 to some extent with the martensitic structure as well as to make the amount of the soft austenitic structure in the first intermediate layer 32 larger than that in the surface layer 31, so that both of the hardness and the toughness of the gear component 100 can be ensured.

In addition, in the first embodiment, as described above, a compressive residual stress of about 1100 MPa (about 600 MPa) or higher is caused to occur in the surface layer 31. As a result, even when a crack occurs in the surface layer 31 in use of the gear component 100, it is thereby possible to suppress the crack from propagating with the compressive residual stress of about 600 MPa or higher. This allows the lifetime of the gear component 100 to be increased.

In addition, in the first embodiment, as described above, when the Si concentration in the starting material steel is set at about 1.5 mass % or more, it is possible to effectively suppress the cementite from residing in crystal grain boundaries. In addition, when the concentration of Si is set at about 2.0 mass % or less, it is possible to suppress the hardness of the starting material steel from increasing higher than required.

In addition, in the first embodiment, as described above, the starting material steel contains one or two of the following elements as optional components.

Mo (molybdenum): about 0.01 mass % or more to about 0.50 mass % or less.

B (boron): about 0.0005 mass % or more to about 0.0050 mass % or less.

Such a configuration enables increase in the strength of crystal grain boundaries and increase in hardenability for the gear component 100, and it is therefore possible to increase the strength of the structure.

In addition, in the first embodiment, as described above, the starting material steel contains one or two of the following elements as optional components.

Nb (niobium): about 0.01 mass % or more to about 0.30 mass % or less.

Ti (titanium): about 0.005 mass % or more to about 0.200 mass % or less.

V (vanadium): about 0.01 mass % or more to about 0.20 mass % or less.

Such a configuration enables suppressing coarsening of the structure in the gear component 100, and it is thus possible to increase the strength of the structure.

In addition, in the producing method according to the first embodiment, as described above, in order to increase the hardness of the surface after the quenching, the concentration of C in the surface layer 31 is set at 0.85 mass % or more to 1.2 mass % or less, which is higher than the concentration of C at an eutectoid point, and in order to transform the retained-austenite structure present in the outer circumferential surface 20 and in a proximity thereof of the workpiece 300 subjected to the quenching into the martensitic structure, the mechanical energy is applied. Here, in the carburizing step, when the concentration of C in the surface layer 31 is set at 0.85 mass % or more, which is higher than the concentration of C at the eutectoid point, carbides such as cementite is likely to be generated in crystal grain boundaries in the cooling step subsequent to the carburizing step, but use is made of a starting material steel in which, regarding Si for suppressing the generation of the carbides, the concentration of Si is set at 1.0 mass % or more, and regarding Cr likely to promote the generation of the carbides, the concentration of Cr is set at 0.20 mass % or less to suppress the generation of the carbides. As a result, the Vickers hardness of the surface layer 31 can be sufficiently increased to HV800 or higher, and the generation of the carbides can be suppressed to set the area fraction of the grain boundary carbides at lower than 2% in the surface layer 31, so that it is possible to suppress the deterioration in fatigue strength of the gear component 100 attributable to the grain boundary carbides. Consequently, the gear component 100 can be suppressed from being broken, which allows the lifetime of the gear component 100 to be increased.

In addition, in the producing method according to the first embodiment, as described above, part of the austenitic structure in the workpiece 200 is made into martensite by performing the high-density energy heating to heat the workpiece 200 (steel component) to a temperature equal to or higher than the Acm transformation point, and then performing the quenching by cooling the austenitized workpiece 200 at a cooling rate equal to or higher than the critical cooling rate at which martensitic transformation occurs (rapid cooling). As a result, by quenching the heated workpiece 200 using water (coolant) at about 10° C. or higher to about 40° C. or lower, a larger portion of the austenitic structure in the workpiece 200 can be made into martensite than in a case of quenching the heated workpiece 200 using coolant at about 140° C., so that the volume ratio of the retained-austenite structure in the workpiece 300 can be reduced. As a result, it is possible to reliably reduce the volume ratio of the retained-austenite structure in the surface layer 31 subjected to the shotpeening.

In addition, in the producing method according to the first embodiment, as described above, the workpiece 200 is cooled after the carburizing step at a cooling rate lower than the cooling rate at which the workpiece 200 undergoes martensitic transformation. Accordingly, even when the carburizing (heat treatment) is performed on the workpiece 200, since the workpiece 200 is cooled in the subsequent cooling step at the cooling rate lower than the cooling rate at which the workpiece 200 undergoes martensitic transformation, it is possible to suppress a strain attributable to the heat treatment (heat treatment strain) from occurring in the workpiece 200 (gear component 100).

In addition, in the producing method according to the first embodiment, as described above, the modifying step is performed to form the surface layer 31 such that the volume ratio of the retained-austenite structure is higher than 0% and less than 10%, and the remainder is a martensitic structure. As a result, the austenitic structure, which is soft, (retained-austenite structure) can be suppressed from being retained in a large amount in the surface layer 31, so that it is possible to sufficiently increase the Vickers hardness of the surface layer 31 to HV800 or higher.

In addition, in the producing method according to the first embodiment, as described above, the shotpeening is performed to modify the retained-austenite structure in a portion of the carburized layer CL2 that is near the outer circumferential surface 20 (portion corresponding to the surface layer 31 of the completed gear component 100). As a result, it is possible to easily modify the austenitic structure in the portion of the carburized layer CL2 that is near the outer circumferential surface 20 to generate a martensitic structure.

In addition, in the producing method according to the first embodiment, as described above, finish processing such as mirror finish may be additionally performed on the outer circumferential surface 20 of the surface layer 31 after the retained-austenite structure is modified, in order to level off projections and depressions formed through the shotpeening. This enables increasing the mesh efficiency of the gear component 100.

In addition, in the producing method according to the first embodiment, as described above, in the quenching step, the austenitized workpiece 200 (steel component) is quenched by performing rapid cooling using coolant at about 10° C. or higher to about 40° C. or lower (coolant at about 25° C.). As a result, it is possible to sufficiently subject part of the austenitic structure in the workpiece 200 to martensitic transformation.

In addition, in the producing method according to the first embodiment, as described above, the workpiece 300 (steel component) is tempered after the high-frequency quenching and before the shotpeening. As a result, the toughness of the martensitic structure that deteriorates through the quenching (quenched martensite structure) can be recovered through the tempering, so that it is possible to increase the toughness in the gear component 100.

In addition, in the producing method according to the first embodiment, as described above, in the carburizing step, the carburizing is performed on the workpiece (gear component) under the reduced-pressure environment. As a result, by suppressing the formation of Si oxide or the like in grain boundaries or the like on the surface of the workpiece attributable to heat in the carburizing, it is possible to suppress the deterioration in grain boundary strength of the surface.

FIRST EXAMPLE

Next, as First Example, description will be made about the measurement of the volume ratio of the retained-austenite structure, measurement of the hardness, measurement of the residual stress, measurement of fatigue strength, and measurement of the area fraction of the grain boundary carbides, which were conducted to confirm the effects of the above first embodiment.

(Configuration of Gear Component in Example 1)

First, the gear component 100 of Example 1 corresponding to the first embodiment (see FIG. 1 to FIG. 3) was fabricated. Specifically, a starting material steel made up of the chemical components of a steel type A shown in Table 1 and subjected to normalizing (a steel bar, see FIG. 5) was first prepared. Note that the starting material steel of this steel type A satisfied the composition ranges described in the present embodiment. In addition, the starting material steel of the steel type A had a Vickers hardness of about HV140. The starting material steel was cut and subjected to rough machining and gear cutting.

TABLE 1

| | COMPONENTS OF STARTING MATERIAL STEEL (mass %) | | | | | | | | |
|---|---|---|---|---|---|---|---|---|---|
| STEEL TYPE | C | Si | Mn | P | S | Cr | Al | N | Mo, B, Ti, Nb, V |
| A | 0.20 | 1.11 | 0.71 | 0.015 | 0.016 | 0.03 | 0.03 | 0.012 | — |
| B | 0.22 | 1.92 | 0.82 | 0.012 | 0.013 | 0.12 | 0.02 | 0.008 | — |
| C | 0.20 | 1.05 | 0.70 | 0.018 | 0.016 | 0.10 | 0.04 | 0.010 | 0.18 (Mo) |
| D | 0.16 | 2.01 | 1.10 | 0.007 | 0.015 | 0.20 | 0.03 | 0.004 | 0.0025 (B), 0.031 (Ti) |
| E | 0.24 | 1.75 | 0.91 | 0.005 | 0.015 | 0.13 | 0.04 | 0.011 | — |
| F | 0.21 | 1.51 | 0.73 | 0.016 | 0.013 | 0.06 | 0.03 | 0.018 | 0.04 (V) |
| G | 0.18 | 1.82 | 0.89 | 0.015 | 0.014 | 0.09 | 0.03 | 0.012 | — |
| H | 0.19 | 1.74 | 0.80 | 0.017 | 0.015 | 0.10 | 0.03 | 0.009 | — |
| I | 0.19 | 1.67 | 0.75 | 0.015 | 0.015 | 0.09 | 0.03 | 0.012 | — |
| J | 0.20 | 1.56 | 0.60 | 0.014 | 0.014 | 0.11 | 0.03 | 0.013 | 0.025 (Mo), 0.03 (Nb) |
| K | 0.19 | 0.81 | 0.81 | 0.014 | 0.013 | 0.19 | 0.03 | 0.012 | — |
| L | 0.20 | 1.21 | 0.65 | 0.015 | 0.015 | 0.31 | 0.03 | 0.011 | — |

Thereafter, the carburizing was performed on the workpiece subjected to the pre-machining processing to set the concentration of C in the surface layer 31 at 1.0 mass %. Thereafter, the slow cooling was performed on the workpiece 200 in a carburizing furnace (see FIG. 5).

Next, the high-frequency quenching was performed on the workpiece 200 subjected to the carburizing and the cooling. First, the induction heating was performed on the workpiece 200 to increase the temperature of the workpiece 200 to 1000° C., higher than the Acm transformation point (about 800° C.), such that the workpiece 200 is austenitized. Thereafter, the rapid cooling was performed on the workpiece 200 by bringing water at 25° C. into direct contact with the workpiece 200 continuously to cool the workpiece 200.

Subsequently, the tempering was performed by bringing the temperature of the workpiece 300 subjected to the rapid cooling (see FIG. 6) to 150° C., which is lower than 600° C.

Finally, the shotpeening was performed on the outer circumferential surface 20 of the workpiece 300. First, as the first phase, media having a diameter of 0.8 mm were shot at the outer circumferential surface 20 of the workpiece 300. Thereafter, as the second phase, media having a diameter of 0.2 mm were shot at the outer circumferential surface 20 of the workpiece 300. Finally, the mirror finish was performed on the outer circumferential surface 20 of the workpiece 300 by polishing the outer circumferential surface 20 with a grindstone. The gear component 100 of Example 1 was thereby fabricated.

(Measurement of Volume Ratio and Residual Stress)

First, in the gear component 100 of Example 1, the volume ratio of the retained-austenite structure ($\gamma_R$) and the residual stress were measured. Specifically, electropolishing was first performed on the tooth flanks 21 to reduce the thickness of the tooth flanks by a predetermined amount. An exposed surface (cross section) then was subjected to the X-ray diffraction method to measure the volume ratio of the retained-austenite structure and the residual stress. In addition, as to the residual stress, a residual stress acting in the tooth trace direction (see FIG. 1) of the tooth flanks 21 was measured. Note that, as a reference example 1, the measurement of the volume ratio of the retained-austenite structure was also performed, as with the gear component 100 of Example 1, on the workpiece 300 before the shotpeening.

(Measurement Results of Volume Ratio)

Figure 8:
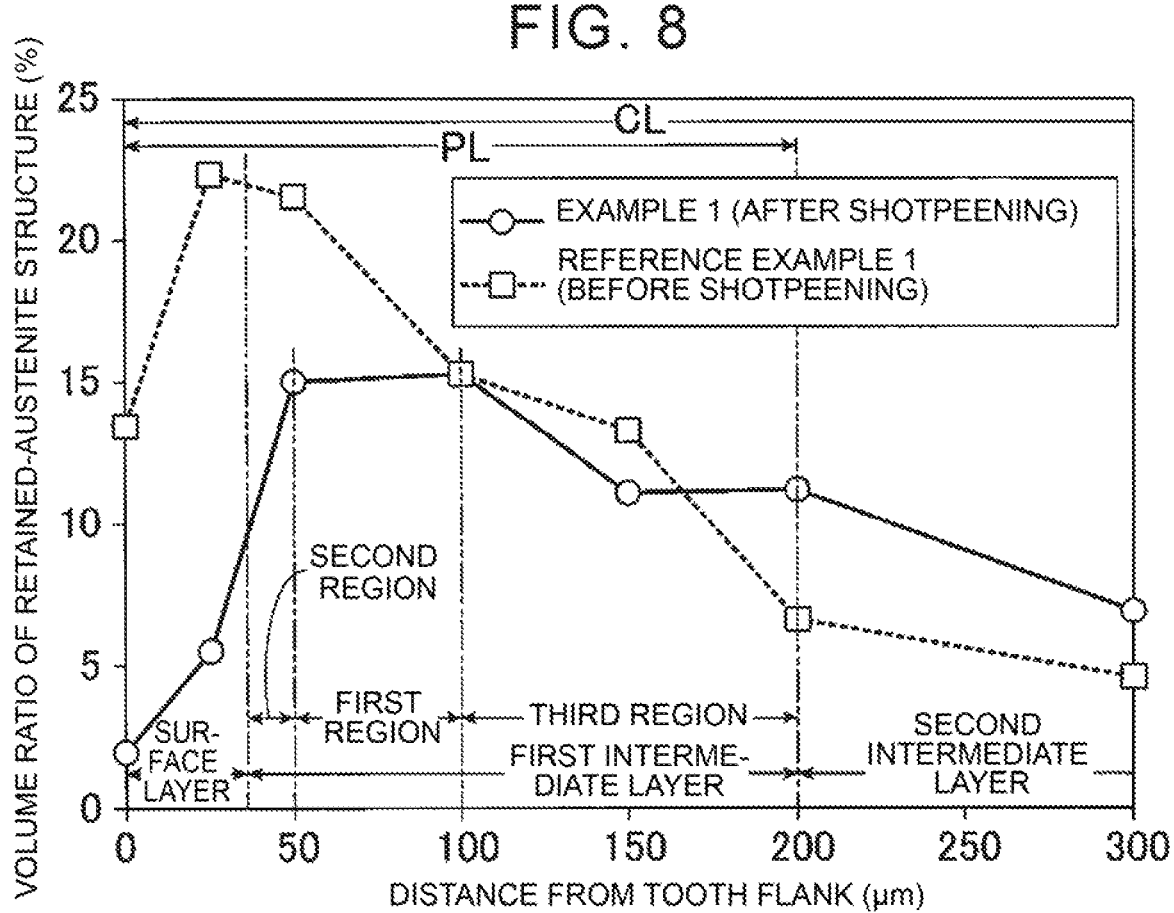
FIG. 8 is a graph illustrating results of measurement about volume ratios of retained-austenite structure in gear components, the measurement being conducted to confirm the effects of the first embodiment.

The measurement results of the volume ratio of the retained-austenite structure are shown in FIG. 8. In the surface layer 31, at depths 35 μm or less from the tooth flanks 21 (outer circumferential surface 20), the volume ratio of the retained-austenite structure that was approximately 23% at the most before the shotpeening was reduced by 10% or larger, and thus the volume ratio was 1% or higher to lower than 10% after the shotpeening. This is considered to be due to the transformation of the retained-austenite structure in the surface layer 31 into a martensitic structure through the shotpeening.

In addition, in the first intermediate layer 32, at a distance of 200 μm or less from the tooth flanks 21 (outer circumferential surface 20) except the surface layer 31, the volume ratio of the retained-austenite structure was 10% or higher. In other words, in the first intermediate layer 32, the volume ratio of a retained-austenite structure was higher than that of the surface layer 31. In addition, in a region of the first intermediate layer 32 at a distance of 50 μm or longer to 100 μm or shorter from the tooth flanks 21 (outer circumferential surface 20) (a first region), the volume ratio of the retained-austenite structure was 15% or higher. In contrast, in each of the other regions of the first intermediate layer 32, (a second region and a third region), the volume ratio of the retained-austenite structure was lower than 15%. Note that the substantially entire portion corresponding to the surface layer 31 and the first intermediate layer 32 (see the carburized layer CL2 in FIG. 6) except the retained-austenite structure is considered to be made into a martensitic structure through the high-frequency quenching.

Note that in the surface layer 31 of the gear component 100 of Example 1, the average volume ratio of the retained-austenite structure was 5%.

(Measurement Results of Residual Stress)

Figure 9:
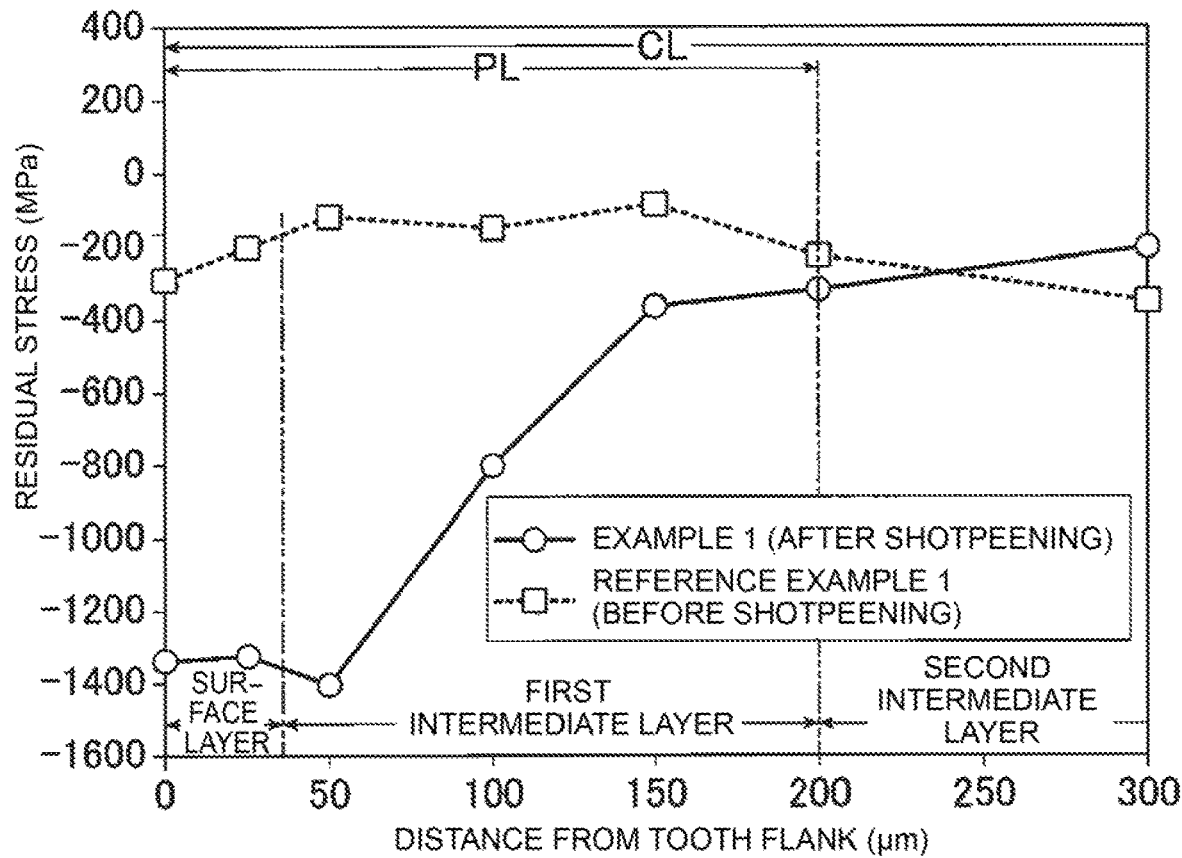
FIG. 9 is a graph illustrating results of measurement about residual stresses in gear components, the measurement being conducted to confirm the effects of the first embodiment.

The measurement results of the residual stress in the tooth flanks 21 are shown in FIG. 9. Note that positive residual stresses are tensile residual stresses acting in a direction away from each other, and negative residual stresses are compressive residual stresses acting in a direction approaching to each other.

The residual stress of the surface layer 31 was a compressive residual stress of 1100 MPa or higher (a residual stress of −1100 MPa or lower), and it was thus confirmed that a very high compressive residual stress occurred. It was therefore confirmed that the shotpeening could cause a high compressive residual stress to occur in the surface layer 31. It was further confirmed that the occurrence of the high compressive residual stress in the surface layer 31 suppressed the propagation of a crack. In addition, as to the residual stress in the first intermediate layer 32, it was also confirmed that a high compressive residual stress occurred on the surface layer 31 side of the first intermediate layer 32.

(Measurement of Hardness)

Next, the Vickers hardness of the gear component 100 of above Example 1 was measured based on JIS Z 2244. Specifically, the Vickers hardness (hardness of the tooth flanks 21) was measured on the surface layer 31 in the respective tooth flanks 21 of the outer circumferential surface subjected to the shotpeening. In addition, using the gear component 100 of Example 1 that was subjected to heat treatment in which the gear component 100 was heated to 300° C. and then cooled, the Vickers hardness was measured on the surface layer 31 in the tooth flank 21 of the gear component 100. In the measurement, a test force applied to a cross section to be measured was set at 300 gf.

Figure 10:
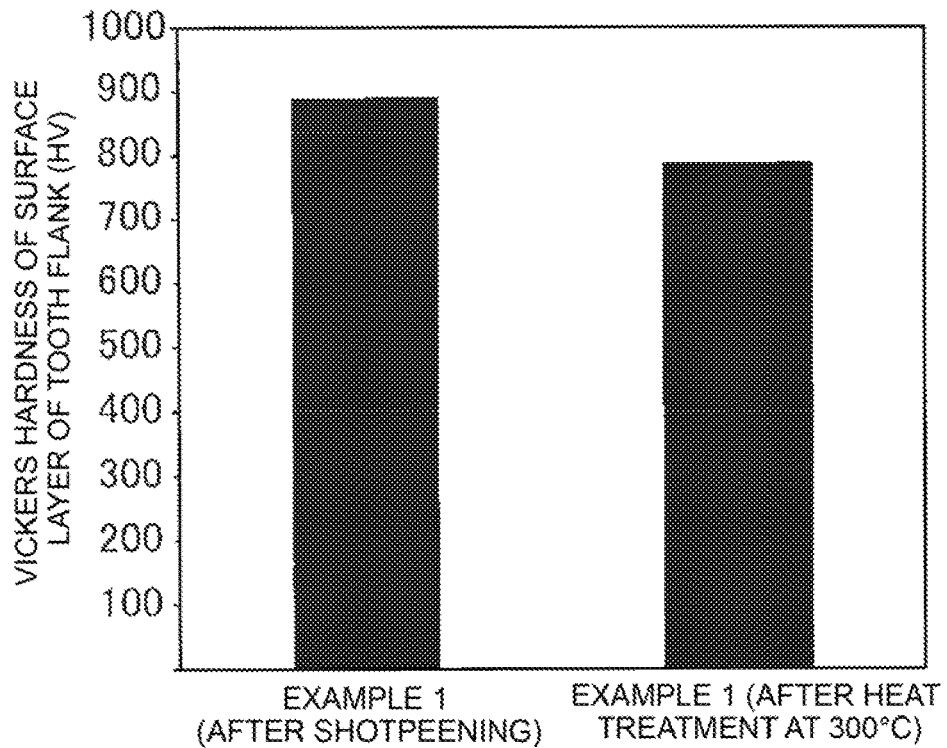
FIG. 10 is a graph illustrating results of measurement about a Vickers hardness of a surface layer in a tooth surface of a gear component, the measurement being conducted to confirm the effects of the first embodiment.

From the measurement results of Vickers hardness shown in FIG. 10, it was confirmed that the Vickers hardness of the surface layer 31 was HV800 or higher (HV890). It was therefore confirmed that the surface layer 31, namely, an outermost layer of the gear component 100, had a sufficient hardness. Consequently, it is considered that the gear component 100 can be effectively suppressed from being broken.

In addition, even after the heat treatment at 300° C., a Vickers hardness of about HV790 was obtained in the surface layer 31. In other words, the surface layer 31 subjected to the heat treatment reduced in the hardness by only about 10% as compared with the surface layer 31 before the heat treatment. This is considered to be due to the increasing of the amount of Si for the starting material steel. Note that this small reduction in the hardness held true for the other layers (first intermediate layer 32, second intermediate layer 33, and innermost layer 35). It was therefore confirmed that the deterioration in the hardness of the gear component 100 can be suppressed even when the gear component 100 is disposed under a high-temperature environment and when heat is generated by mating the gear component 100 with another gear component.

(Measurement of Concentration of C)

Next, the concentration of C of the gear component 100 of above Example 1 was measured using an electron probe micro analyzer. Specifically, in the gear component 100 of Example 1, the concentration of C in the surface layer 31 in the tooth flank 21 of the outer circumferential surface 20 subjected to the shotpeening (concentration of C in the tooth flank 21) was measured.

As the measurement results, the concentration of C in the surface layer 31 of Example 1 was 0.99%, which was confirmed to be a concentration of C that achieves both a sufficient hardness and a proper volume ratio of the retained-austenite structure.

(Measurement of Fatigue Strength)

Next, the fatigue strength of the gear component 100 of above Example 1 was evaluated. Specifically, using a power circulation type gear tester, the bending fatigue strength of a fillet of the gear component 100 (a boundary between the tooth flank 21 and the root surface 23), and the flank fatigue strength of the tooth flank 21 were evaluated. In the evaluation, automatic transmission fluid was used as lubricant, and the test was conducted under conditions including a lubricant temperature of 80° C. and the number of revolutions of 2000 rpm. In addition, a torque was applied to the gear component 100 such that a bending stress on the fillet is 500 MPa, and a maximum interfacial pressure on the tooth flank is 2000 MPa, and a target number of cycles was set at 10000000 times.

As to the evaluation of the bending fatigue strength and the evaluation of the flank fatigue strength, in both evaluations, no breakage occurred in the gear component 100 of Example 1 even after the stress was applied 10000000 times. As a result, it was confirmed that the gear component 100 of Example 1 had such a high fatigue strength that the gear component 100 can bear the stress repeatedly applied 10000000 times. This is considered to be due to the increase in the fatigue strength of the gear component 100 mainly based on the hardness of the surface layer 31 being high.

(Measurement of Area Fraction of Grain Boundary Carbides)

Next, the area fraction of grain boundary carbides in the surface layer 31 of the gear component 100 of Example 1 was measured. Specifically, the gear component 100 was first cut in a direction perpendicular to the tooth flank 21, and an exposed cross section was subjected to mirror polish. Thereafter, etching is performed on the cross section with Nital reagent (an alcohol solution with nitric acid added thereto) to bring the grain boundary carbides into view on the cross section. Subsequently, under an optical microscope, the cross section of the surface layer 31 was captured at 500× magnification. Image processing then was performed on the captured cross section having a predetermined area to distinguish between the grain boundary carbides and other portions by binary conversion, and then, the area fraction of the grain boundary carbides (=(the area of the grain boundary carbides in the cross section/the area of the entire cross section)×100) (%) was calculated.

As to the measurement results of the area fraction, no grain boundary carbides was observed in the surface layer 31 of the gear component 100 of Example 1, and thus the area fraction of grain boundary carbides was 0%. This is considered to be due to successful suppression of the precipitation of the carbides in crystal grain boundaries by setting the concentration of Si at 1.0 mass % or more and setting the concentration of Cr at 0.20 mass % or less.

SECOND EXAMPLE

Next, as Second Example, in order to confirm the effects of the above first embodiment, a plurality of starting material steels were used to fabricate gear components, and the gear components were compared in terms of the concentration of C in the surface layer, the volume ratio of the retained-austenite structure, the area fraction of the grain boundary carbides, and the hardness and the fatigue strength of the surface layer of the tooth flank.

(Composition of Starting Material Steel)

First, as starting material steels (steel bars), the above starting material steel A, as well as starting material steels B to L shown in Table 1 were prepared.

Here, the starting material steels A to J satisfied the composition ranges described in the present embodiment, whereas the starting material steels K and L did not satisfy the composition ranges described in the present embodiment. Specifically, the starting material steel K had a concentration of Si lower than the composition ranges shown in the present embodiment (1.0 mass % or more to 3.0 mass % or less), and the starting material steel L had a concentration of Cr higher than the composition ranges shown in the present embodiment (0.01 mass % or more to 0.20 mass % or less).

As in Example 1 of the above First Example, the gear components were fabricated. Specifically, the starting material steels B to L were used to fabricate gear components of Examples 1 to 10 and comparative examples 1 and 2. In addition, gear components of comparative examples 3 and 4 were fabricated such that the gear components were made from the starting material steel A but fabricated under a condition for the carburizing different from the condition for Example 1 of the above First Example. Specifically, for the comparative example 3, the carburizing was performed such that the concentration of C is less than 0.85 mass % (0.74 mass %) to fabricate the gear component of the comparative example 3. In addition, for the comparative example 4, the carburizing was performed such that the concentration of C is more than 1.2 mass % (1.25 mass %) to fabricate the gear component of the comparative example 4. In addition, for a reference example 2, the starting material steel A was used to fabricate a gear component of the reference example 2 in a similar manner to Example 1 of the above First Example except that the shotpeening was not performed.

Next, for each of the fabricated gear components, as in the above First Example, the concentration of C in the surface layer, the volume ratio of the retained-austenite structure, the area fraction of the grain boundary carbides, and the hardness and the fatigue strength of the surface layer of the tooth flank were measured (evaluated). The measurement (evaluation) results are shown in Table 2.

concentration of C of the surface layer at 0.85 mass % or more to 1.2 mass % or less, performing the cooling at the cooling rate equal to or higher than the critical cooling rate to perform the quenching, and applying the mechanical energy to the austenitic structure on the outer peripheral surface side, and consequently, the Vickers hardness of the surface layer can be set at HV800 or higher. In addition, it was confirmed that the Vickers hardness of the surface layer can be made higher than HV850 except Example 9, namely Examples 1 to 8 and 10. In addition, in the gear components of Examples 1 to 10 having the above properties, no breakages occurred in the evaluation of the fatigue strength even after the stress was applied 10000000 times. In other words, it was confirmed that the gear components of Examples 1 to 10 had high fatigue strengths.

In contrast, as seen in the comparative examples 1 and 2, when the starting material steels not satisfying the composition ranges described in the above embodiment were used, the area fraction of the grain boundary carbides in the surface layer was 2% or higher even if the gear components were fabricated by the same producing method as Examples 1 to 10. In the evaluation of the fatigue strength, the gear components of the comparative examples 1 and 2 could not

TABLE 2

| | STEEL TYPE | C CONCEN- TRATION IN SURFACE LAYER (mass %) | VOLUME RATIO OF RETAINED- AUSTENITE STRUCTURE (%) | AREA FRACTION OF GRAIN BOUN- DARY CARBIDES (%) | SURFACE LAYER HARD- NESS OF TOOTH FLANK (HV) | FATIGUE STRENGTH |
|---|---|---|---|---|---|---|
| EXAMPLE 1 | A | 0.99 | 4 | 0 | 890 | ENDURED 10000000 TIMES |
| EXAMPLE 2 | B | 0.91 | 3 | 0 | 905 | ENDURED 10000000 TIMES |
| EXAMPLE 3 | C | 0.95 | 5 | 0 | 875 | ENDURED 10000000 TIMES |
| EXAMPLE 4 | D | 1.15 | 9 | 0 | 862 | ENDURED 10000000 TIMES |
| EXAMPLE 5 | E | 1.05 | 6 | 0 | 878 | ENDURED 10000000 TIMES |
| EXAMPLE 6 | F | 0.85 | 3 | 0 | 897 | ENDURED 10000000 TIMES |
| EXAMPLE 7 | G | 0.92 | 5 | 0 | 868 | ENDURED 10000000 TIMES |
| EXAMPLE 8 | H | 1.03 | 4 | 0 | 888 | ENDURED 10000000 TIMES |
| EXAMPLE 9 | I | 0.81 | 5 | 0 | 825 | ENDURED 10000000 TIMES |
| EXAMPLE 10 | J | 1.05 | 1 | 1 | 871 | ENDURED 10000000 TIMES |
| COMPARATIVE EXAMPLE 1 | K | 1.10 | 0 | 3 | 851 | FILLET BREAKAGE OCCURRED |
| COMPARATIVE EXAMPLE 2 | L | 1.03 | 1 | 2 | 859 | FILLET BREAKAGE OCCURRED |
| COMPARATIVE EXAMPLE 3 | A | 0.74 | 3 | 0 | 794 | PITTING OCCURRED |
| COMPARATIVE EXAMPLE 4 | A | 1.25 | 58 | 1 | 522 | PITTING OCCURRED |
| REFERENCE EXAMPLE 2 | A | 0.99 | 19 | 0 | 720 | PITTING OCCURRED |

As to the measurement (evaluation) results, it was confirmed that, as seen in Examples 1 to 10, the volume ratio of the retained-austenite structure can be made 0% or higher to 10% or lower, and the area fraction of the grain boundary carbides in the surface layer can be made lower than 2% by using starting material steels satisfying the composition ranges described in the above embodiment, setting the bear the application of the stress 10000000 times; the gear components were broken in the middle of the test with a fillet fractured. As a result, it was confirmed that when the starting material steels not satisfying the composition ranges described in the above embodiment were used, gear components having sufficient fatigue strengths could not be fabricated.

In addition, as seen in the comparative examples 3 and 4, making the concentration of C in the surface layer less than 0.85 mass % or more than 1.2 mass % resulted that the Vickers hardness of the surface layer was less than HV800 even when starting material steels satisfying the composition ranges described in the above embodiment were used. In the evaluation of the fatigue strength, the gear components of the comparative examples 3 and 4 allowed the formation of a hole (pitting) on the tooth flank in the middle of the test due to low Vickers hardness of the surface layer of the tooth flank. As a result, it was confirmed that when the concentration of C in the surface layer is less than 0.85 mass % or more than 1.2 mass %, gear components having sufficient fatigue strengths could not be fabricated. In particular, in the comparative example 4, where the concentration of C in the surface layer was more than 1.2 mass %, the volume ratio of the retained-austenite structure was 58%, which was a significantly high volume ratio, so that the Vickers hardness of the surface of the tooth flank became as significantly low as HV522.

In addition, as seen in the reference example 2, even when a starting material steel satisfying the composition ranges described in the above embodiment was used, omitting treatment to apply the mechanical energy to the austenitic structure on the outer peripheral surface side, such as the shotpeening, resulted that the volume ratio of the retained-austenite structure was as high as 19%, and the Vickers hardness of the surface layer was HV720. In the evaluation of the fatigue strength, the gear component of the reference example 2 allowed the formation of a pitting on the tooth flank in the middle of the test due to a low Vickers hardness of the surface layer of the tooth flank. As a result, it was confirmed that when the treatment to apply the mechanical energy to the austenitic structure on the outer peripheral surface side is omitted, gear components having sufficient fatigue strengths could not be fabricated.

Second Embodiment

Next, a second embodiment will be described. In the second embodiment, description will be made about an example where a shaft member 400 is used rather than the gear component 100, as a "steel component" in the scope of claims.

[Structure of Shaft Member]

First, the structure of the shaft member 400 according to the second embodiment will be described with reference to FIG. 11 to FIG. 14. Note that description of the same configuration as that of the gear component 100 according to the first embodiment will be omitted as appropriate.

Figure 11:
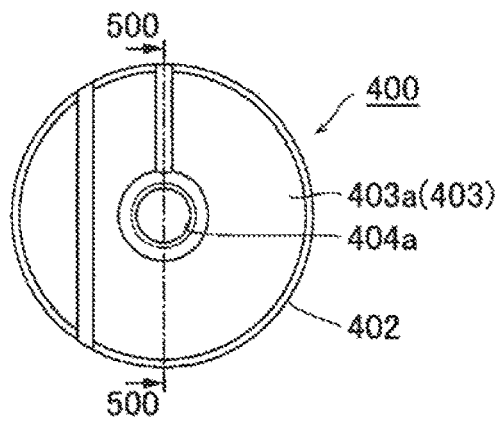
FIG. 11 is a plan view of a shaft member according to a second embodiment as viewed in an axial direction.
Figure 12:
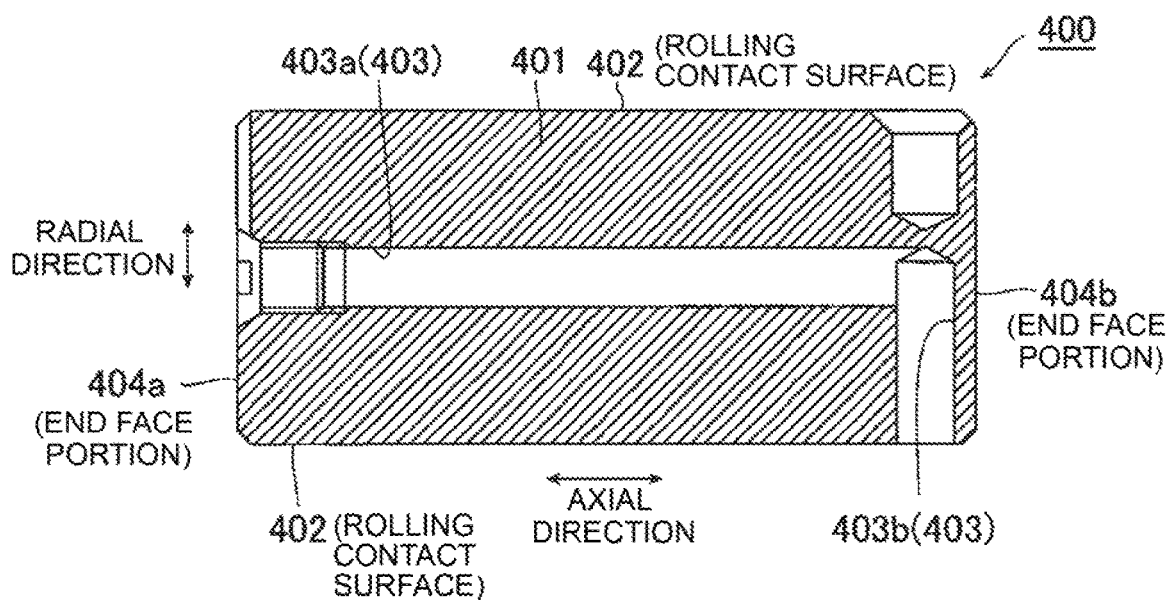
FIG. 12 is a sectional view taken along the line 500-500 in FIG. 11.

The shaft member 400 according to the second embodiment, which is fabricated by performing machining and treatment on a starting material steel having the same composition as the starting material steel used for the gear component 100 in the above first embodiment, is what is called a pinion shaft as illustrated in FIG. 11 and FIG. 12. This shaft member 400 is fabricated by, as with the gear component 100 of the above first embodiment, performing the rough machining as machining processing and thereafter performing the carburizing, the cooling, the high-frequency quenching, the tempering, and the shotpeening in this order.

In the shaft member 400, a support shaft 401 in a columnar shape includes an outer circumferential surface extending in an axial direction, and the outer circumferential surface serves as a rolling contact surface 402. In the support shaft 401, an oil passage hole 403 is formed. The oil passage hole 403 includes a main oil passage hole 403a laying at a center in a radial direction and extending in the axial direction, and a branched oil passage hole 403b being opened on the rolling contact surface 402 and supplying lubricating oil to the rolling contact surface 402. The main oil passage hole 403a is opened on an end face portion 404a laying on one side in the axial direction and extends to a proximity of an end face portion 404b on the other side in the axial direction. Note that the end face portions 404a and 404b are an example of "axial-direction end surface portions" in the scope of claims.

Figure 13:
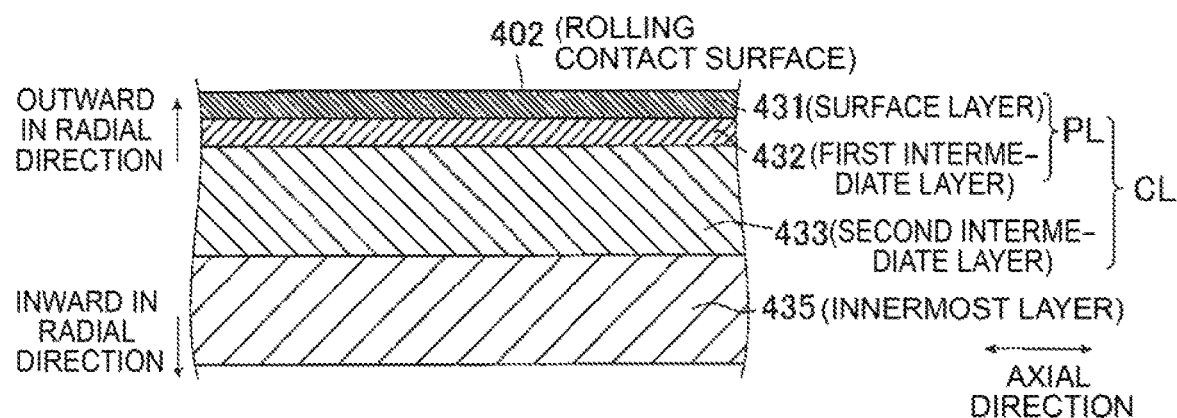
FIG. 13 is an enlarged sectional view of a vicinity of a rolling contact surface of the shaft member according to the second embodiment.
Figure 14:
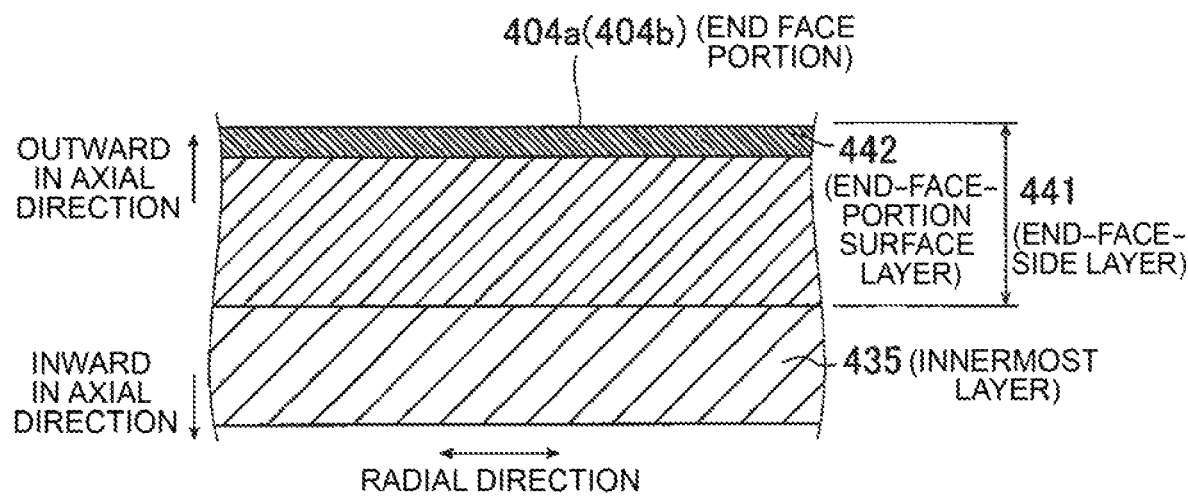
FIG. 14 is an enlarged sectional view of a vicinity of an end face portion of the shaft member according to the second embodiment.

As illustrated in FIG. 13, on an outer circumferential surface side of the shaft member 400, a surface layer 431 provided on the rolling contact surface 402 and in a proximity of the rolling contact surface 402, a first intermediate layer 432 inside the surface layer 431 in the radial direction, a second intermediate layer 433 inside the first intermediate layer 432 in the radial direction, and an innermost layer 435 inside the second intermediate layer 433 in the radial direction are formed. In addition, as illustrated in FIG. 14, in each of the end face portions 404a and 404b, an end-face-side layer 441 is formed. Note that, inside the end-face-side layer 441 in the axial direction, the innermost layer 435 is positioned. In addition, the rolling contact surface 402 and the end face portions 404a and 404b are polished by performing mirror finish or the like.

the surface layer 431 has the same properties as the surface layer 31 of the above first embodiment. In other words, in the surface layer 431, the concentration of C is set at 0.85 mass % or more to 1.2 mass % or less through the carburizing. In addition, in the surface layer 431, the volume ratio of a retained-austenite structure is higher than 0% and lower than 10%, and the remainder is a martensitic structure. In addition, in the surface layer 431, the retained-austenite structure and the martensitic structure are both formed to have an area fraction of grain boundary carbides of lower than 2%.

the first intermediate layer 432 has the same properties as the first intermediate layer 32 of the above first embodiment. In other words, in the first intermediate layer 432, the volume ratio of a retained-austenite structure is higher than the surface layer 431, and the remainder is a martensitic structure. In addition, the second intermediate layer 433 and the innermost layer 435 have the same properties as the second intermediate layer 33 and the innermost layer 35 of the above first embodiment, respectively.

as illustrated in FIG. 14, the end-face-side layer 441 is a region that is treated by the carburizing, the cooling, the high-frequency quenching, and the tempering. In other words, as compared with the treatments performed on the outer circumferential surface, the end-face-side layer 441 is a region that is subjected to the treatments except the shotpeening. Note that, through the carburizing, the end-face-side layer 441 is formed such that the concentration of C increases as the end-face-side layer 441 extends from an outer side toward an inner side in the axial direction.

In addition, in proximities of the end face portions 404a and 404b, the end-face-side layers 441 are not subjected to the shotpeening, as described above. For that reason, in the end face portions 404a and 404b, although there is a quenched martensite structure into which part of an austenitic structure is transformed, there is no martensitic structure attributable to mechanical energy, unlike the surface layer 431 of the rolling contact surface 402. Accordingly, the volume ratio of the retained-austenite structure in the end-face-side layers 441 (end-face-portion surface layers 442) is higher than the volume ratio of the retained-austenite structure in the surface layer 431 of the rolling contact surface 402. In addition, the hardness of the end-face-portion surface layers 442 is lower than the hardness of the surface layer 431 of the rolling contact surface 402. Furthermore, in the end face portions 404a and 404b, compressive residual stress attributable to mechanical energy does not occur.

Note that the carburizing, the cooling, the high-frequency quenching, the tempering, and the shotpeening in a producing method for the shaft member 400 according to the second embodiment are the same as the carburizing, the cooling, the high-frequency quenching, the tempering, and shotpeening according to the above first embodiment, respectively, and description thereof will be omitted.

[Effects of Second Embodiment]

According to the second embodiment, the following effects can be obtained.

In the second embodiment, as described above, the rolling contact surface 402 is structured such that the concentration of C in the surface layer 431 is set at 0.85 mass % or more, the concentration of C in the surface layer 431 is set at 1.2 mass % or less, the volume ratio of the retained-austenite structure in the surface layer 431 is higher than 0% and lower than 10%, and the remainder of the surface layer 431 is a martensitic structure. Furthermore, in addition to setting the concentration of C in the surface layer 431 at 1.2 mass % or less, in the starting material steel, the concentration of Si is set at 1.0 mass % or more, and the concentration of Cr is set at 0.20 mass % or less. With these settings, it is possible to suppress the shaft member 400 from being broken, which allows the lifetime of the shaft member 400 to be increased, as in the above first embodiment. Moreover, unlike a case where the concentration of C in the surface layer 431 is 1.5 mass %, the austenitic structure, which is soft, (retained-austenite structure) can be suppressed from being retained in the surface layer 431 by 10% or more, so that the Vickers hardness of the surface layer 431 can be sufficiently increased to HV800 or higher.

In addition, in the second embodiment, as described above, the volume ratio of the retained-austenite structure in the end-face-portion surface layers 442 is made higher than the volume ratio of the retained-austenite structure in the surface layer 431 of the rolling contact surface 402. In addition, the hardness of the end-face-portion surface layers 442 is made lower than the hardness of the surface layer 431 of the rolling contact surface 402. As a result, it is possible to sufficiently increase the hardness of the surface layer 431 of the rolling contact surface 402. In addition, by decreasing the hardness of the end-face-portion surface layers 442, it is possible to easily perform swaging work, laser welding, or the like to join the shaft member 400 to another member. Note that the other effects of the second embodiment are the same as those of the above first embodiment.

Next, description will be made about a rolling contact fatigue test on the shaft member 400 conducted to confirm the effects of the above second embodiment.

(Configuration of Shaft Member of Example 11)

First, the shaft member 400 of Example 11 corresponding to the second embodiment (see FIG. 11 and FIG. 12) was fabricated. Specifically, a starting material steel made up of the chemical components of a steel type B shown in Table 1 and subjected to normalizing was first prepared. Note that the starting material steel of this steel type B satisfied the composition ranges described in the present embodiment. The starting material steel was cut and subjected to the rough machining.

Thereafter, the carburizing was performed on a workpiece subjected to the pre-machining processing to set the concentration of C in the surface layer 431 at 1.0 mass %. Thereafter, the slow cooling was performed on the workpiece in a carburizing furnace.

Next, the high-frequency quenching was performed on the workpiece subjected to the carburizing and the cooling. First, the induction heating is performed on the workpiece to increase the temperature of the workpiece to 1000° C., higher than the Acm transformation point (about 800° C.), such that the workpiece is austenitized. Thereafter, the rapid cooling was performed on the workpiece by bringing water at 25° C. into direct contact with the workpiece continuously to cool the workpiece.

Subsequently, the tempering was performed by bringing the temperature of the workpiece subjected to the rapid cooling to 150° C., which is lower than 600° C.

Finally, the shotpeening was performed on the rolling contact surface 402 of the workpiece. First, as the first phase, media having a diameter of 0.8 mm were shot at the rolling contact surface 402 of the workpiece. Thereafter, as the second phase, media having a diameter of 0.2 mm were shot at the rolling contact surface 402 of the workpiece. Finally, the mirror finish was performed on the rolling contact surface 402 of the workpiece by polishing the rolling contact surface 402 with a grindstone. In addition, the end face portions 404a and 404b were subjected to semi-mirror finish. The shaft member 400 of Example 11 was thereby fabricated.

In addition, as a comparative example 5 for Example 11, a shaft member made of a steel material of SUJ2 (conforming to JIS4805 2008) and having the same external shape as the shaft member 400 of Example 11 was prepared. The shaft member made of SUJ2 was subjected to the high frequency hardening at 1000° C. and thereafter subjected to the tempering at 150° C., to be fabricated into the shaft member of the comparative example 5. In other words, the shaft member of the comparative example 5 is different from the shaft member 400 of Example 11 in the composition of the starting material steel and is not subjected to the carburizing and the shotpeening.

(Rolling Contact Fatigue Test)

A rolling contact fatigue test was conducted on the shaft member 400 of Example 11 and the shaft member of the comparative example 5. In the rolling contact fatigue test, a cylindrical rolling contact fatigue tester (manufactured by NTN Corporation) was used to conduct a cycle test under test conditions including a load of 600 kgf/mm² and the number of revolutions of 46240 rpm. In the test, the outer circumferential surface of the shaft member that serves as the rolling contact surface was caused to abut against a rolling member of the cylindrical rolling contact fatigue tester. The total number of revolutions (number of cycles) at which flaking (peeling) occurred on the rolling contact surface was used as an index of durability for the rolling contact surfaces of the shaft member 400 of Example 11 and the shaft member of the comparative example 5.

(Results of Rolling Contact Fatigue Test)

Figure 15:
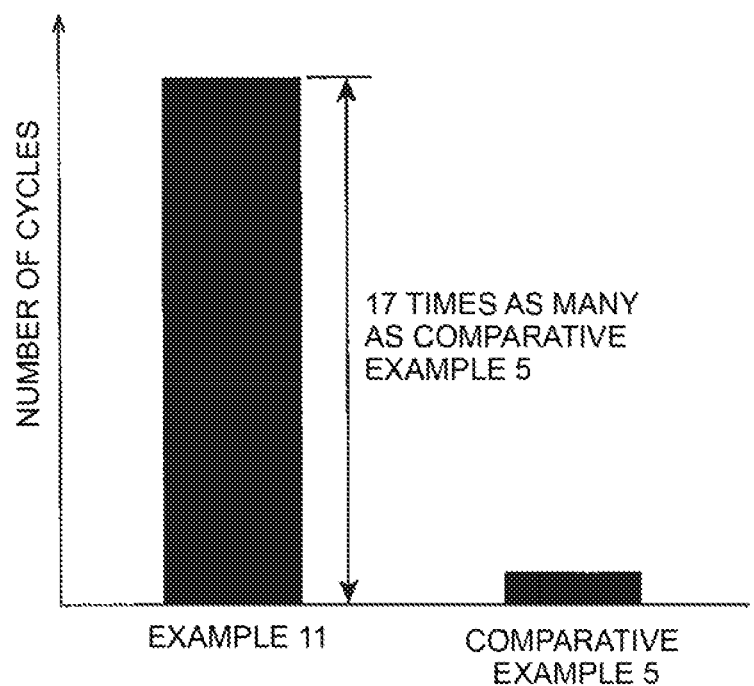
FIG. 15 is a graph illustrating results of a rolling contact fatigue test on the rolling contact surface of the shaft member, the rolling contact fatigue test being conducted to confirm the effects of the second embodiment.

The results of the rolling contact fatigue test are shown in FIG. 15. As to the results of the rolling contact fatigue test, the number of cycles of the shaft member 400 of Example 11 was about 17 times as many as the number of cycles of the shaft member of the comparative example 5. Consequently, it was confirmed that the rolling contact surface 402 of the shaft member 400 of Example 11 had a very high rolling contact durability as compared with the rolling contact surface of the shaft member of the comparative example 5. This is considered to be due to the increase in the hardness of the surface layer 431 resulted from the suppression of deterioration in fatigue strength caused by a low area fraction of the grain boundary carbides in the surface layer 431, and from the reduction in the volume ratio of the retained-austenite structure and the increase in the volume ratio of the martensitic structure in the surface layer 431.

(Modifications)

It should be understood that all the aspects of the embodiments and examples disclosed herein are merely for illustrative purposes and are non-limitative. The scope of the present invention is specified not by the above description of the embodiments and the examples but by the scope of claims, and all modifications within the equivalents and the scope of claims will be construed as being included in the present invention.

For example, in the above first embodiment, the gear component is described as an example of the "steel component" in the scope of claims, and in the above second embodiment, the shaft member (pinion shaft) is described as an example of the "steel component" in the scope of claims, but the present invention is not limited to these examples. In addition to the gear component and the shaft member, the "steel component" in the scope of claims may be a bearing component such as a bearing. In addition, the gear component may be a gear component other than the gear component of the above first embodiment, for example, a gear component that is short in length in its axial direction (small in thickness). Furthermore, the shaft member may be a shaft other than the shaft (pinion shaft) of the above second embodiment. The "steel component" in the scope of claims may be a driving component other than the shaft.

In addition, in the above first embodiment, the description is made about an example of forming the surface layer and the layer inside the surface layer (first intermediate layer), as well as the second intermediate layer, the inner-circumferential-surface-side layer, and the innermost layer, in the gear component. In addition, in the above second embodiment, the description is made about an example of forming the surface layer and the layer inside the surface layer (first intermediate layer), as well as the second intermediate layer and the innermost layer, in the rolling contact surface of the shaft member. However, the present invention is not limited to these examples. The gear component may include a surface layer having a concentration of C of 0.85 mass % or more to 1.2 mass % or less, having a volume ratio of a retained-austenite structure of higher than 0% and lower than 10%, and having an area fraction of grain boundary carbides of lower than 2%, and include a layer inside the surface layer having a volume ratio of a retained-austenite structure higher than the surface layer and including the remainder being a martensitic structure.

In addition, in the above first and second embodiments, the description is made about an example where the shotpeening is performed on the workpieces as a method for applying the mechanical energy to the retained-austenite structure, but the present invention is not limited to this example. The method for applying the mechanical energy may be, in place of the shotpeening, for example, cavitation peening exploiting bubble collapse, laser peening exploiting laser, polishing such as burnishing polishing in which the polishing is performed under pressure, and polishing using a grindstone, and what is called a sub-zero treatment in which a workpiece is cooled to 0° C. or less. In addition, these treatments may be used in combination to apply the mechanical energy to the retained-austenite structure.

In addition, in the above first and second embodiments, the description is made about an example where the shotpeening is performed after the high-frequency quenching and the tempering, but the present invention is not limited to this example. For example, a polishing step of polishing the workpiece may be added before the shotpeening and after the high-frequency quenching or the tempering.

In addition, in the above first and second embodiments, the description is made about an example where the high-frequency heating is performed on the workpieces as the high-density energy heating, but the present invention is not limited to this example. For example, as the high-density energy heating, the workpiece may be heated by performing laser irradiation or electron beam irradiation in place of the high-frequency heating.

In addition, in the above first and second embodiments, the description is made about an example where the entire workpiece is heated in the high-frequency quenching, but the present invention is not limited to this example. It will suffice to perform the high-frequency quenching at least on the surface layer and a layer inside the surface layer. In the quenching, performing the high-density energy heating enables intensive heating only of portions corresponding to the surface layer and the layer inside the surface layer to increase the temperature of the portions to the Acm transformation point or higher. Specifically, in the above first embodiment, the quench treatment may be performed only on a side where the teeth of the gear component are formed, or only on the inner circumferential surface. In addition, in the above second embodiment, the quench treatment may be performed only on the rolling contact surface.

In addition, in the above first and second embodiments, the description is made about an example where, in the high-frequency quenching, the workpiece is subjected to the rapid cooling using the water at about 25° C. as the coolant (the workpiece is cooled at the cooling rate equal to or higher than the critical cooling rate), but the present invention is not limited to this example. For example, the rapid cooling in the high-frequency quenching may be performed using a coolant other than the water. Specifically, the rapid cooling may be performed using water or oil with an additive.

In addition, in the above first and second embodiments, the description is made about an example where the mirror finish is performed by polishing the outer circumferential surface of the workpiece using a grindstone, but the present invention is not limited to this example. For example, the mirror finish may be performed by polishing the workpiece using a polishing device other than the grindstone. Specifically, the mirror finish may be performed by polishing the outer circumferential surface of the workpiece by barrel polishing, chemical polishing, polishing by jetting polishing material, or other kinds of polishing.

In addition, in the above second example, the description is made about an example where ten kinds of starting material steels were used, but the present invention is not limited to this example. The starting material steels are not limited to starting material steels containing the chemical components shown in the examples and may be starting material steels satisfying the ranges of the chemical components described in the embodiment.

In addition, in the above first and second embodiments, the description is made about an example where the workpiece is tempered after the high-frequency quenching and before the shotpeening (the treatment to apply the mechanical energy), but the present invention is not limited to this example. For example, the workpiece (steel component) may be tempered after the treatment to apply the mechanical energy, or the workpiece (steel component) may be tempered before the treatment to apply the mechanical energy, and then the workpiece (steel component) may be tempered again after the treatment to apply the mechanical energy. Alternatively, the workpiece may be subjected only to the high-frequency quenching and the treatment to apply the mechanical energy without the tempering.

In addition, in the above second embodiment, the description is made about an example where the shotpeening is not performed on the axial-direction end face portions of the shaft member, but the present invention is not limited to this example. The shotpeening may be performed on not only the rolling contact surface of the shaft member but also the axial-direction end face portions. In this case, the axial-direction end face portions have the same layer structure as the rolling contact surface, so that the fatigue strength and the wear resistance of the axial-direction end face portions are increased.

In addition, in the configuration of the above second embodiment, part or the whole of end-face-portion side layers each including an end-face-portion surface layer and a layer inside the end-face-portion surface layer may be removed by performing cutting working on the axial-direction end face portions of the shaft member. As a result, by making the hardness of surfaces of the axial-direction end face portions after the cutting lower than the hardness of the surfaces of the axial-direction end face portions before the cutting, it is possible to easily perform swaging work, laser welding, or the like to fix the shaft member to another member on an axial-direction end face portion.

DESCRIPTION OF THE REFERENCE NUMERALS 31, 431 surface layer
32, 432 first intermediate layer (layer inside surface layer)
33, 433 second intermediate layer
35, 435 innermost layer
100 gear component (steel component)
400 shaft member (steel component)
402 rolling contact surface (outer circumferential surface)
404a, 404b end face portion (axial-direction end face portion)
442 end-face-portion surface layer The invention is:

1. A steel component that is made of starting material steel comprising, as chemical components:
C (carbon): 0.05 mass % or more to 0.30 mass % or less;
Si (silicon): 1.0 mass % or more to 3.0 mass % or less;
Mn (manganese): 0.1 mass % or more to 3.0 mass % or less;
P (phosphorus): 0.03 mass % or less;
S (sulfur): 0.001 mass % or more to 0.150 mass % or less;
Cr (chromium): 0.01 mass % or more to 0.20 mass % or less;
Al (aluminum): 0.01 mass % or more to 0.05 mass % or less;
N (nitrogen): 0.003 mass % or more to 0.030 mass % or less; and
Fe, trace amounts of other alloy components as optional components, and unavoidable impurities: a balance, wherein
a concentration of C in a surface layer of the steel component is 0.85 mass % or more to 1.2 mass % or less that is higher than a concentration of C in the starting material steel,
the surface layer has a volume ratio of a retained-austenite structure of higher than 0% and lower than 10%, a remainder of the surface layer is a martensitic structure, and an area fraction of grain boundary carbides in the surface layer is lower than 2%, and
a layer inside the surface layer has a volume ratio of a retained-austenite structure higher than the volume ratio of the retained-austenite structure in the surface layer, and in the layer inside the surface layer, a remainder is a martensitic structure.

2. The steel component according to claim 1, wherein the concentration of C in the surface layer is 0.9 mass % or more to 1.1 mass % or less.

3. The steel component according to claim 1, wherein the volume ratio of the retained-austenite structure in the layer inside the surface layer is 15% or higher.

4. The steel component according to claim 1, wherein a compressive residual stress of 600 MPa or higher occurs in the surface layer.

5. The steel component according to claim 1, wherein the starting material steel contains 1.5 mass % or more to 2.0 mass % or less of Si (silicon).

6. The steel component according to claim 1, wherein the starting material steel contains one or two of:
Mo (molybdenum): 0.01 mass % or more to 0.50 mass % or less; and
B (boron): 0.0005 mass % or more to 0.0050 mass % or less,
as a trace amount of other alloy components being optional components.

7. The steel component according to claim 1, wherein the starting material steel contains one or two of:
Nb (niobium): 0.01 mass % or more to 0.30 mass % or less;
Ti (titanium): 0.005 mass % or more to 0.200 mass % or less; and
V (vanadium): 0.01 mass % or more to 0.20 mass % or less,
as a trace amount of other alloy components being optional components.

8. A gear component formed of the steel component according to claim 1, wherein the surface layer is a surface layer of a tooth flank of the gear component.

9. A shaft member formed of the steel component according to claim 1, wherein the surface layer is a surface layer of an outer circumferential surface of the shaft member, the outer circumferential surface extending in an axial direction of the shaft member.

10. The shaft member according to claim 9, comprising an axial-direction end face portion, wherein
a volume ratio of a retained-austenite structure in an end-face-portion surface layer of the axial-direction end face portion is higher than a volume ratio of a retained-austenite structure in the surface layer of the outer circumferential surface.

11. The shaft member according to claim 9, comprising an axial-direction end face portion, wherein
a surface hardness of an end-face-portion surface layer of the axial-direction end face portion is lower than a surface hardness of the surface layer of the outer circumferential surface.

12. A producing method for a steel component that is made of a starting material steel containing, as chemical components:
- C (carbon): 0.05 mass % or more to 0.30 mass % or less;
- Si (silicon): 1.0 mass % or more to 3.0 mass % or less;
- Mn (manganese): 0.1 mass % or more to 3.0 mass % or less;
- P (phosphorus): 0.03 mass % or less;
- S (sulfur): 0.001 mass % or more to 0.150 mass % or less;
- Cr (chromium): 0.01 mass % or more to 0.20 mass % or less;
- Al (aluminum): 0.01 mass % or more to 0.05 mass % or less;
- N (nitrogen): 0.003 mass % or more to 0.030 mass % or less; and
- Fe, and trace amounts of other alloy components as optional components, and unavoidable impurities: a balance, the producing method comprising:
- a carburizing step of performing carburizing on the steel component such that a concentration of C in a surface and a proximity of the surface of the steel component is 0.85 mass % or more to 1.2 mass % or less that is higher than a concentration of C in the starting material steel;
- a cooling step of, after the carburizing step, cooling the steel component at a cooling rate lower than a cooling rate at which the steel component undergoes martensitic transformation;
- a quenching step of, after the cooling step, making part of an austenitic structure in the steel component into martensite by performing high-density energy heating to heat the steel component to a temperature equal to or higher than an austenitizing temperature, and then performing quenching by cooling the steel component being austenitized at a cooling rate equal to or higher than the cooling rate at which martensitic transformation occurs; and
- a modifying step of, after the quenching step, making a layer inside a surface layer higher than the surface layer in a volume ratio of a retained-austenite structure, and making a remainder into a martensitic structure, by applying mechanical energy to a surface and a proximity of the surface of the steel component to modify the austenitic structure in the steel component into a martensitic structure.

13. The producing method for a steel component according to claim 12, wherein as a result of the modifying step, the surface layer has a volume ratio of the retained-austenite structure of higher than 0% and lower than 10%, and a remainder is the martensitic structure.

14. The producing method for a steel component according to claim 12, wherein the starting material steel further contains one or two of:
- Mo (molybdenum): 0.01 mass % or more to 0.50 mass % or less; and
- B (boron): 0.0005 mass % or more to 0.0050 mass % or less,
- as trace amounts of other alloy components being optional components.

15. The producing method for a steel component according to claim 12, wherein the starting material steel further contains one or two of:
- Nb (niobium): 0.01 mass % or more to 0.30 mass % or less;
- Ti (titanium): 0.005 mass % or more to 0.200 mass % or less; and
- V (vanadium): 0.01 mass % or more to 0.20 mass % or less,
- as trace amounts of other alloy components being optional components.

16. The producing method for a steel component according to claim 12, wherein in the modifying step, an austenitic structure in a portion of the steel component that is near the surface is modified through shotpeening.

17. The producing method for a steel component according to claim 12, wherein in the modifying step, mirror finish is performed on the surface layer after the austenitic structure is modified.

18. The producing method for a steel component according to claim 12, wherein in the quenching step, the steel component being austenitized is quenched by cooling the steel component at a cooling rate equal to or higher than a critical cooling rate using a coolant at 10° C. or higher to 40° C. or lower.

19. The producing method for a steel component according to claim 12, wherein the steel component is tempered after the quenching step and before the modifying step.

20. The producing method for a steel component according to claim 12, wherein in the carburizing step, carburizing is performed on the steel component under a reduced-pressure environment.

* * * * *